(12) United States Patent
Roth et al.

(10) Patent No.: US 9,113,595 B2
(45) Date of Patent: Aug. 25, 2015

(54) QUICK-CHANGE BLADE SYSTEM

(75) Inventors: Chris Roth, Harrisburg, NC (US);
Darren Chandler, Orangeburg, SC (US); Lennie Rhoades, Charlotte, NC (US); Steve Brinkman, Martinez, GA (US); Sean Dwyer, Gastonia, NC (US)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 14/348,291

(22) PCT Filed: Apr. 27, 2012

(86) PCT No.: PCT/US2012/035496
§ 371 (c)(1),
(2), (4) Date: Mar. 28, 2014

(87) PCT Pub. No.: WO2013/048574
PCT Pub. Date: Apr. 4, 2013

(65) Prior Publication Data
US 2014/0223877 A1    Aug. 14, 2014

Related U.S. Application Data

(60) Provisional application No. 61/540,744, filed on Sep. 29, 2011.

(51) Int. Cl.
*A01D 34/00* (2006.01)
*A01D 34/73* (2006.01)
(Continued)

(52) U.S. Cl.
CPC .............. *A01D 34/733* (2013.01); *A01D 34/64* (2013.01); *A01D 34/664* (2013.01); *A01D 34/81* (2013.01); *E05C 19/14* (2013.01)

(58) Field of Classification Search
CPC .................................................... A01D 34/733
USPC ............ 56/17.5, 255, 295, DIG. 19, DIG. 20
See application file for complete search history.

(56) References Cited

U.S. PATENT DOCUMENTS 2,854,807 A * 10/1958 Byler et al. .................... 56/295
3,085,386 A    4/1963 Slemmons
(Continued)

FOREIGN PATENT DOCUMENTS

CN     201781775 U    4/2011
DE      20308046 U1    7/2003
(Continued)

OTHER PUBLICATIONS

International Search Report and Written Opinion of PCT/US2012/035496 mailed Jul. 13, 2012.
(Continued)

*Primary Examiner* — Thomas B Will
*Assistant Examiner* — Mai Nguyen
(74) *Attorney, Agent, or Firm* — Nelson Mullins Riley & Scarborough LLP

(57) ABSTRACT

A lawn care device may include a cutting deck housing at least one blade, a rotatable shaft, and a blade mount operably coupled to the rotatable shaft. The blade mount may include at least one engagement slot configured to enclose at least a portion of the at least one blade. The blade mount may further include at least one protruding member disposed within the engagement slot to secure the at least one blade within the engagement slot responsive to insertion of the at least one blade into the engagement slot.

20 Claims, 24 Drawing Sheets

(51) Int. Cl.
*A01D 34/66* (2006.01)
*E05C 19/14* (2006.01)
*A01D 34/64* (2006.01)
*A01D 34/81* (2006.01)

(56) References Cited

U.S. PATENT DOCUMENTS

| | | | |
|---|---|---|---|
| 3,157,978 A | 11/1964 | McMullen | |
| 3,252,304 A | 5/1966 | Moody | |
| 3,563,015 A | 2/1971 | Renfroe | |
| 3,683,606 A | 8/1972 | Staines | |
| 3,698,167 A | 10/1972 | Hurlburt et al. | |
| 3,747,966 A | 7/1973 | Wilkes et al. | |
| 3,877,146 A | 4/1975 | Pittinger | |
| 3,958,402 A * | 5/1976 | Bouet | 56/295 |
| 4,049,301 A | 9/1977 | Schenk | |
| 4,176,508 A | 12/1979 | Baumann et al. | |
| 4,307,558 A | 12/1981 | Bent et al. | |
| 4,478,029 A | 10/1984 | Moore et al. | |
| 4,525,990 A | 7/1985 | Zweegers | |
| 4,543,693 A | 10/1985 | Cunningham | |
| 4,586,257 A | 5/1986 | Rittenhouse | |
| 4,645,372 A | 2/1987 | Suzuki | |
| 4,712,364 A | 12/1987 | Oxley | |
| 4,815,264 A | 3/1989 | Mijnders | |
| 4,817,372 A | 4/1989 | Toda et al. | |
| 4,927,286 A | 5/1990 | Hobluigie et al. | |
| 4,989,398 A | 2/1991 | Kuhn et al. | |
| 5,018,347 A | 5/1991 | Feilen | |
| 5,019,113 A | 5/1991 | Burnell | |
| 5,036,654 A | 8/1991 | Malutich | |
| 5,210,998 A | 5/1993 | Hojo et al. | |
| 5,303,476 A | 4/1994 | Tuggle | |
| 5,462,318 A | 10/1995 | Cooke | |
| 5,493,785 A | 2/1996 | Lawrence | |
| 5,619,847 A | 4/1997 | Cox, Jr. | |
| 5,622,035 A | 4/1997 | Kondo et al. | |
| 5,640,836 A | 6/1997 | Lingerfelt | |
| 5,782,073 A | 7/1998 | Sheldon | |
| 5,791,131 A | 8/1998 | Hill et al. | |
| 5,845,468 A | 12/1998 | Richardson et al. | |
| 5,845,471 A * | 12/1998 | Seegert et al. | 56/17.2 |
| 5,960,617 A | 10/1999 | Sheldon | |
| 6,013,010 A | 1/2000 | Farsaie | |
| 6,119,350 A | 9/2000 | Sutliff et al. | |
| 6,205,755 B1 | 3/2001 | Bontrager et al. | |
| 6,347,445 B2 | 2/2002 | Long, Jr. | |
| 6,354,564 B1 | 3/2002 | Van Scyoc et al. | |
| 6,367,235 B1 | 4/2002 | Moynihan | |
| 6,374,465 B1 | 4/2002 | Dykstra | |
| 6,681,865 B2 | 1/2004 | Pace | |
| 6,688,095 B2 | 2/2004 | Wadzinski | |
| 6,889,491 B2 * | 5/2005 | Buchko | 56/249 |
| 6,894,486 B2 | 5/2005 | Omekanda et al. | |
| 6,935,095 B1 | 8/2005 | Sluder | |
| 6,959,530 B2 | 11/2005 | Thompson et al. | |
| 7,124,566 B2 | 10/2006 | Treger et al. | |
| 7,490,459 B2 | 2/2009 | Thompson et al. | |
| 7,506,494 B2 | 3/2009 | Eavenson, Sr. et al. | |
| 7,588,090 B2 * | 9/2009 | Dairon et al. | 172/123 |
| 7,644,568 B2 * | 1/2010 | Buchko | 56/249 |
| 7,703,267 B2 | 4/2010 | Tapper | |
| 7,703,268 B2 | 4/2010 | Yanke | |
| 7,730,708 B2 | 6/2010 | Siler | |
| 7,743,478 B2 | 6/2010 | Thompson et al. | |
| 7,775,026 B2 | 8/2010 | Bever | |
| 7,784,254 B2 | 8/2010 | Bever | |
| 7,814,735 B2 | 10/2010 | Neudorf | |
| 7,958,710 B2 | 6/2011 | Gilpatrick et al. | |
| 2003/0182918 A1 | 10/2003 | Stone et al. | |
| 2003/0200662 A1 * | 10/2003 | Moore | 30/276 |
| 2003/0226344 A1 | 12/2003 | Buchko | |
| 2004/0093842 A1 | 5/2004 | Cooper | |
| 2005/0229572 A1 | 10/2005 | Dairon et al. | |
| 2006/0150609 A1 | 7/2006 | Igl | |
| 2008/0253852 A1 | 10/2008 | Miller et al. | |
| 2008/0277127 A1 | 11/2008 | Dixon | |
| 2009/0100819 A1 | 4/2009 | Myers | |
| 2009/0282798 A1 | 11/2009 | Buchko | |
| 2009/0308044 A1 | 12/2009 | Bever | |
| 2010/0071338 A1 | 3/2010 | Yanke | |
| 2010/0257832 A1 | 10/2010 | Smith | |
| 2010/0326034 A1 | 12/2010 | Gilpatrick et al. | |

FOREIGN PATENT DOCUMENTS

FR 2893222 A1 5/2007
WO 2011070213 A1 6/2011

OTHER PUBLICATIONS

International Search Report and Written Opinion of PCT/US2012/057510 mailed Dec. 14, 2012.
International Search Report and Written Opinion of PCT/US2012/057522 mailed Dec. 17, 2012.
Chapter II International Preliminary Report on Patentability of PCT/US2012/035496 mailed Jan. 14, 2014.
Chapter I International Preliminary Report on Patentability of PCT/US2012/057510 mailed Apr. 1, 2014.
Chapter I International Preliminary Report on Patentability of PCT/US2012/057522 mailed Apr. 1, 2014.
Examination Report from co-pending Australian application No. 2012316766 mailed May 29, 2014.

* cited by examiner

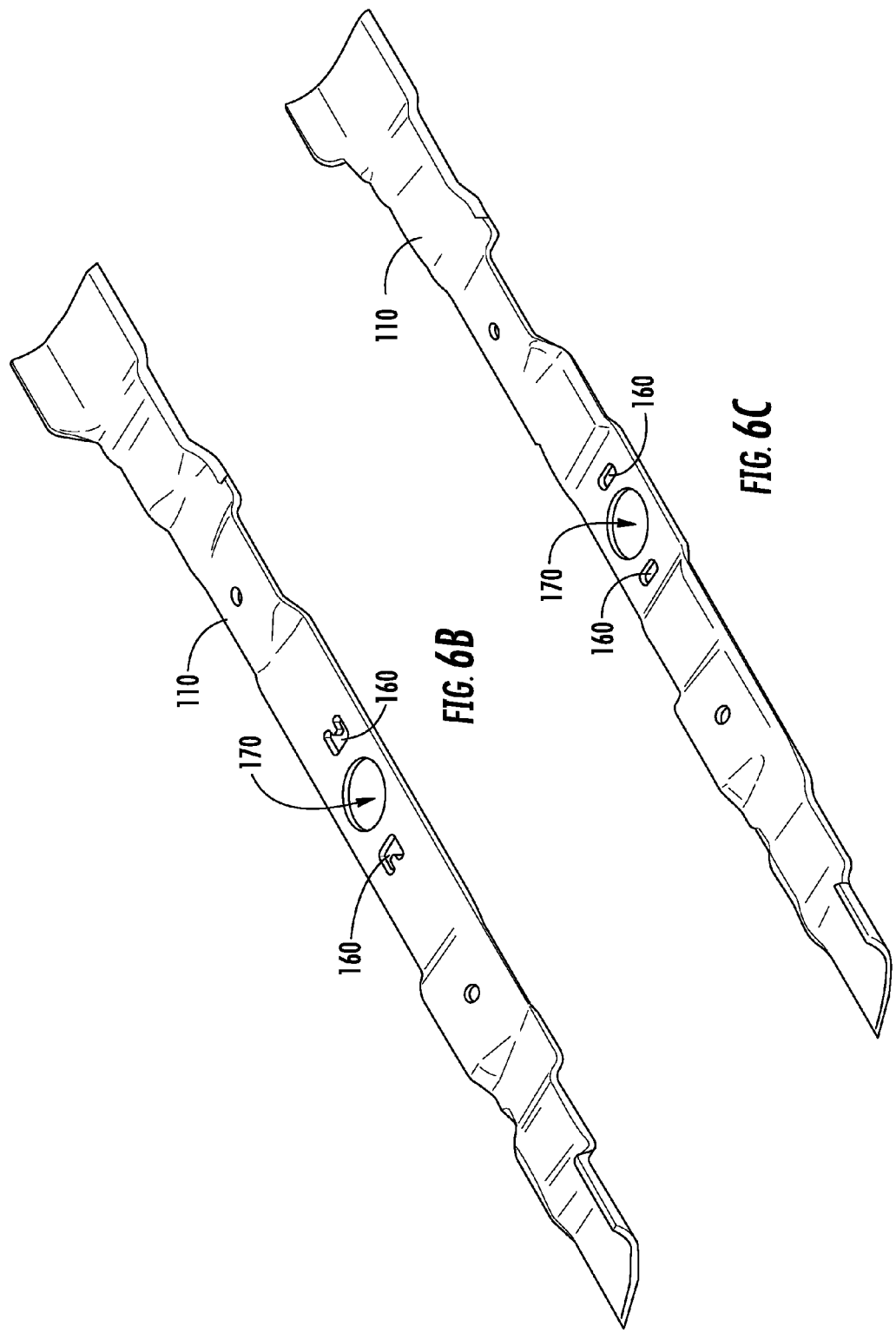

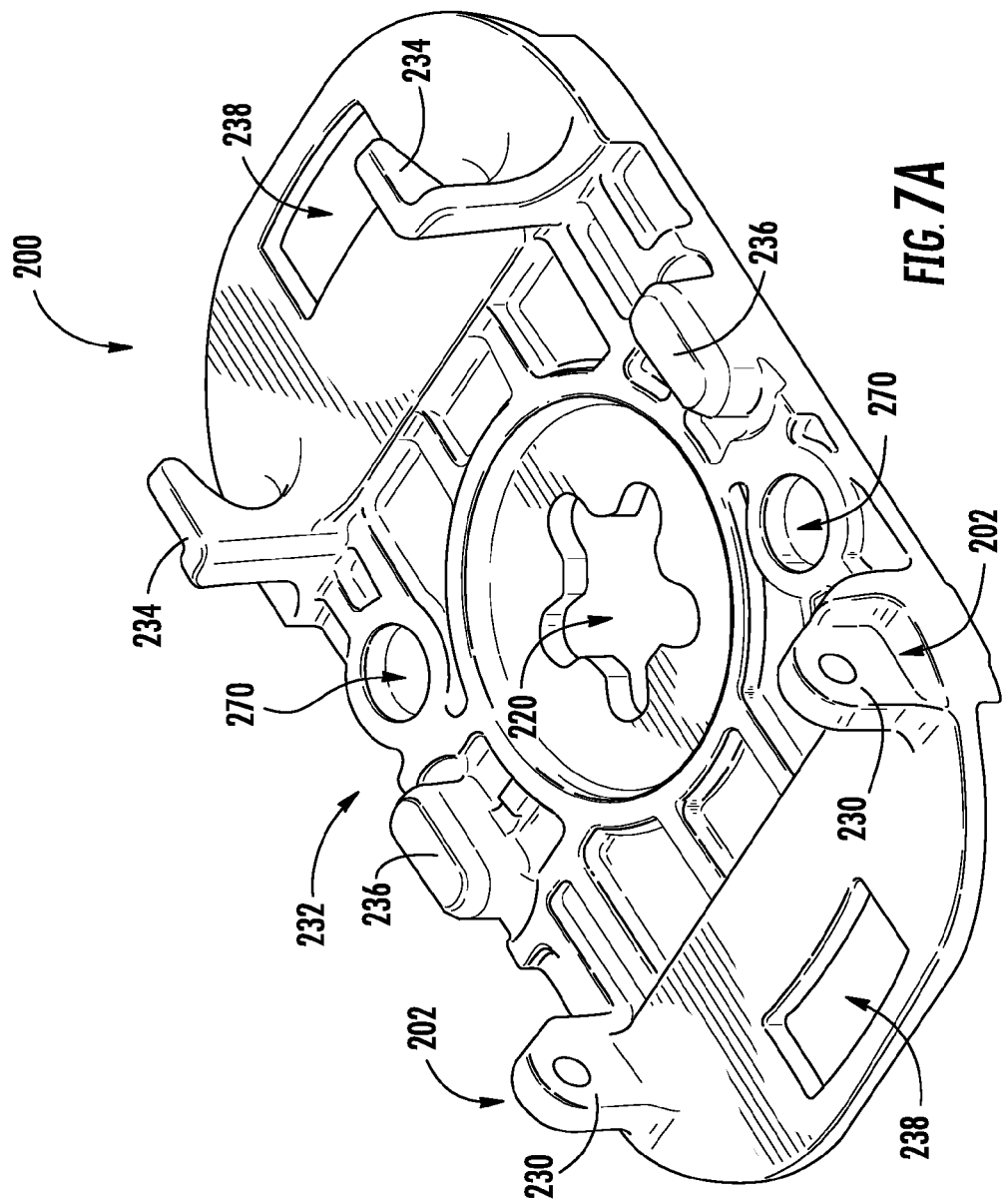

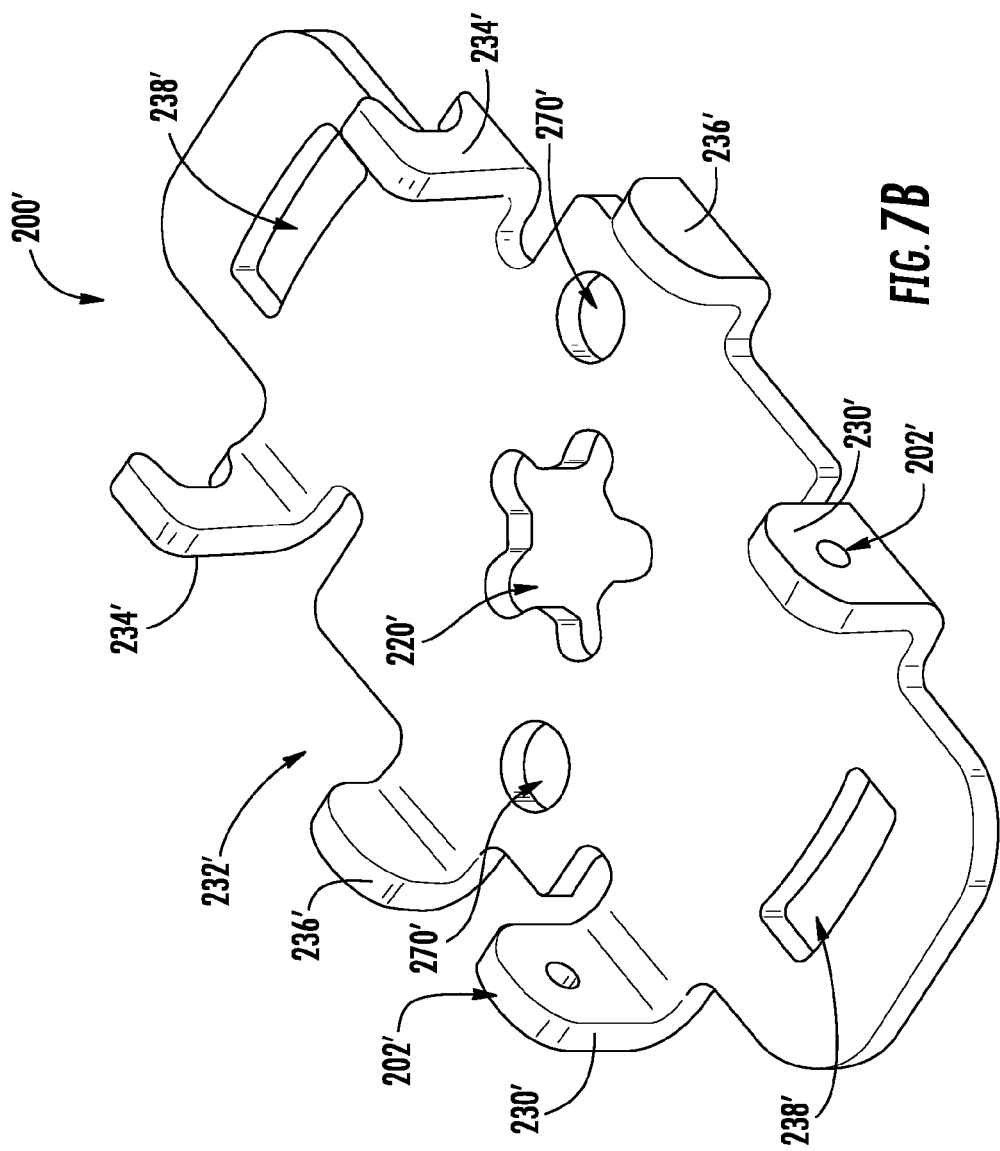

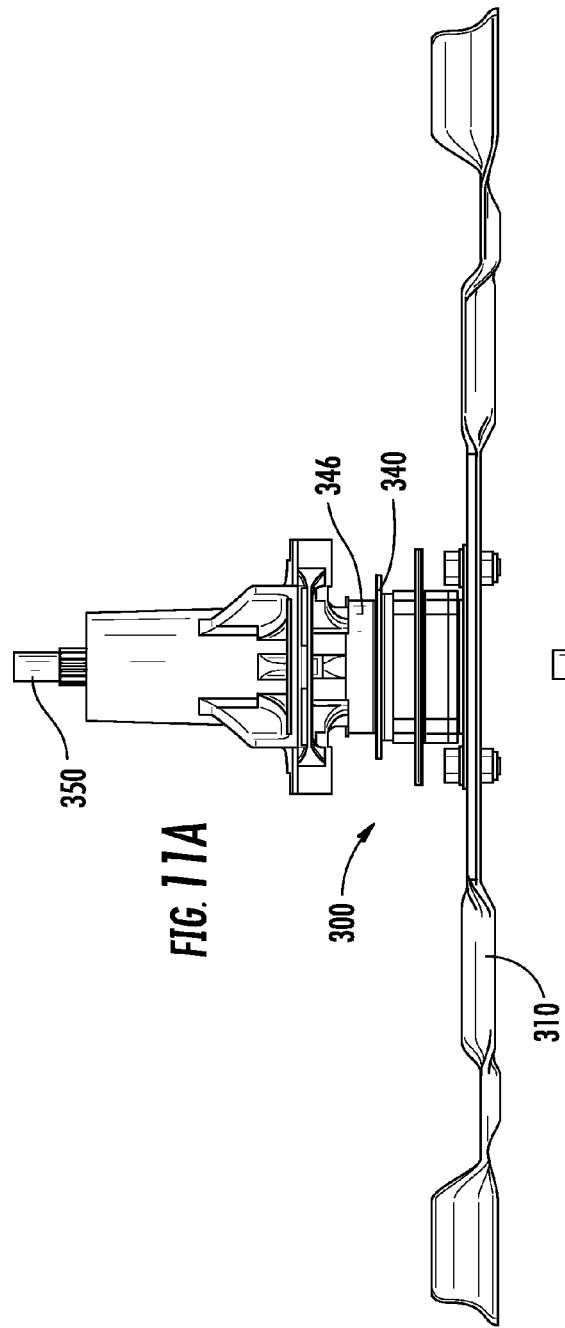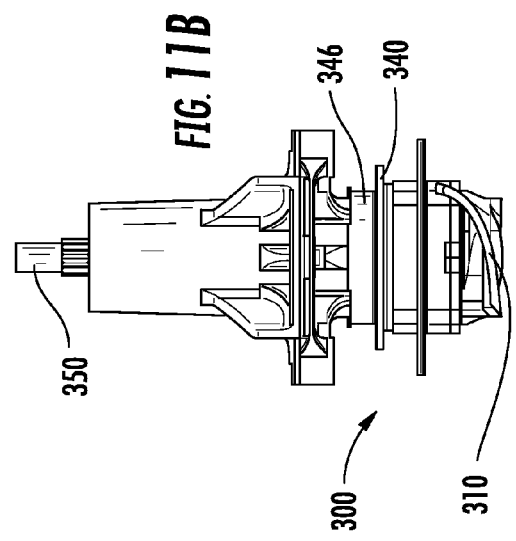

QUICK-CHANGE BLADE SYSTEM

CROSS-REFERENCE TO RELATED APPLICATIONS

This application claims the benefit of U.S. Provisional Application No. 61/540,744 filed on Nov. 29, 2011, the entire contents of which are hereby incorporated herein by reference.

TECHNICAL FIELD

Example embodiments generally relate to outdoor power equipment and, more particularly, some embodiments relate to a lawn mower with a blade assembly that has blades that can be quickly removed and/or replaced.

BACKGROUND

Lawn care tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines and are relatively inexpensive. Meanwhile, at the other end of the spectrum, riding lawn mowers, such as lawn tractors, can be quite large. Riding lawn mowers can sometimes also be configured with various functional accessories (e.g., trailers, tillers and/or the like) in addition to grass cutting components. Riding lawn mowers provide the convenience of a riding vehicle as well as a typically larger cutting deck as compared to a walk-behind model.

The cutting blades of a lawn mower are an important, but sometimes overlooked, component of the lawn mower. The sharpness of the lawn mower blade impacts the quality of cut achieved using the corresponding blade. In this regard, for example, if a blade is not sharp, blades of grass may receive an uneven cut and the ends of the grass may tend to brown, leaving a less desirable appearance to the lawn and increasing susceptibility to some diseases. Meanwhile, using a sharp blade can achieve a cleaner cut that leaves a more appealing appearance to the cut lawn.

Blade sharpening or replacement requires removal of the blade from the lawn mower. Some lawn mower operators may be intimidated by the prospect of removing the blades either due to their perception of the complexity or difficulty of the task or due to their perception of the likelihood that tools that they do not possess may be required to complete the task.

In some cases, different styles of blades may be employed for cutting, mulching, or other lawn care tasks. An unwillingness or lack of desire to make blade changes can also cause lawn mower operators to fail to achieve the full potential of their lawn mowers.

BRIEF SUMMARY OF SOME EXAMPLES

Some example embodiments may provide a quick-change blade system that may allow users to make blade changes on a lawn mower relatively quickly and easily. In this regard, for example, some embodiments may provide for blade designs and corresponding mounting apparatuses that may enable operators to change blades with only very simple tools, or perhaps no tools at all. Furthermore, some example embodiments may provide for a blade change system that may be back fitted to existing lawn mowers. Thus, for example, some embodiments may provide for mounting apparatuses that may be configured to attach to an existing cutting deck and enable the existing cutting deck to thereafter support the use of quick-change blades as described herein.

Some example embodiments may improve the ability of operators to change blades quickly and easily. Operators may therefore take fuller advantage of the capabilities of their lawn mowers, and have a greater satisfaction with the performance of their lawn mowers.

In an example embodiment, a lawn care device is provided. The lawn care device may include a cutting deck housing at least one blade, a rotatable shaft, and a blade mount operably coupled to the rotatable shaft. The blade mount may include at least one engagement slot configured to enclose at least a portion of the at least one blade. The blade mount may further include at least one protruding member disposed within the engagement slot to secure the at least one blade within the engagement slot responsive to insertion of the at least one blade into the engagement slot.

In another example embodiment, a blade mount may be provided. The blade mount may be configured to couple a blade to a rotatable shaft. The blade mount may include at least one engagement slot configured to enclose at least a portion of the blade, and at least one protruding member disposed within the engagement slot to secure the blade within the engagement slot responsive to insertion of the blade into the engagement slot.

In another example embodiment, a cutting blade for a lawn mower is provided. The blade may include a top face, a bottom face, and at least one alignment slot forming a cutout portion of the blade passing from one of the top face or bottom face toward the other of the top face or the bottom face. The at least one alignment slot may be disposed spaced apart from an axis of rotation of the blade to receive a corresponding protruding member of a blade mount configured to hold the blade, via engagement of the protruding member with the at least one alignment slot, at a portion of the blade other than at the axis of rotation during rotation of the blade responsive to operation of the lawn mower.

It will be appreciated that, although some embodiments of the invention are illustrated herein as providing a quick-change system for blades on a lawn mower (e.g., a riding lawn mower, a walk-behind lawn mower, or the like), the quick-change mounting apparatuses described herein may be used to similarly couple other devices together. For example, the mounting apparatuses described herein may be used to couple cutting elements to other types of lawn care equipment, such as trimmers, edgers, circular saws, chainsaws, and/or the like. The mounting apparatuses may also be used to couple rotary elements in devices other than lawn care equipment. For example, the mounting apparatuses described herein may be used to attach fan blades to a fan.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 6A:
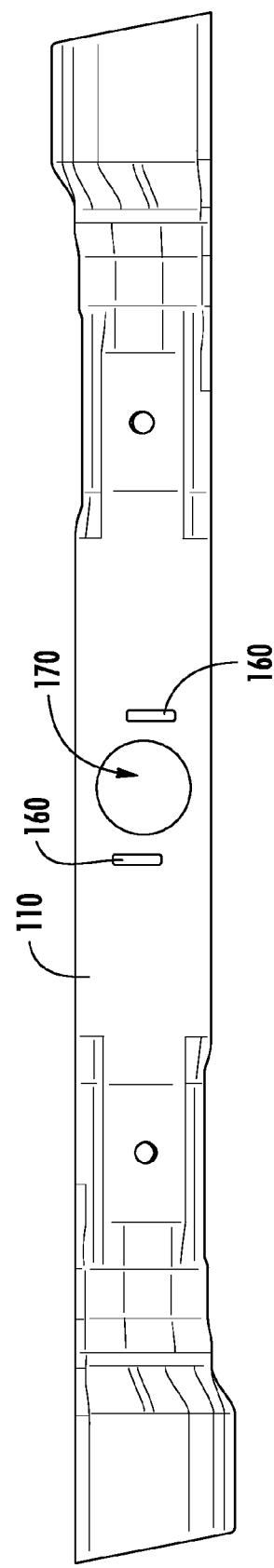
Figure 8:
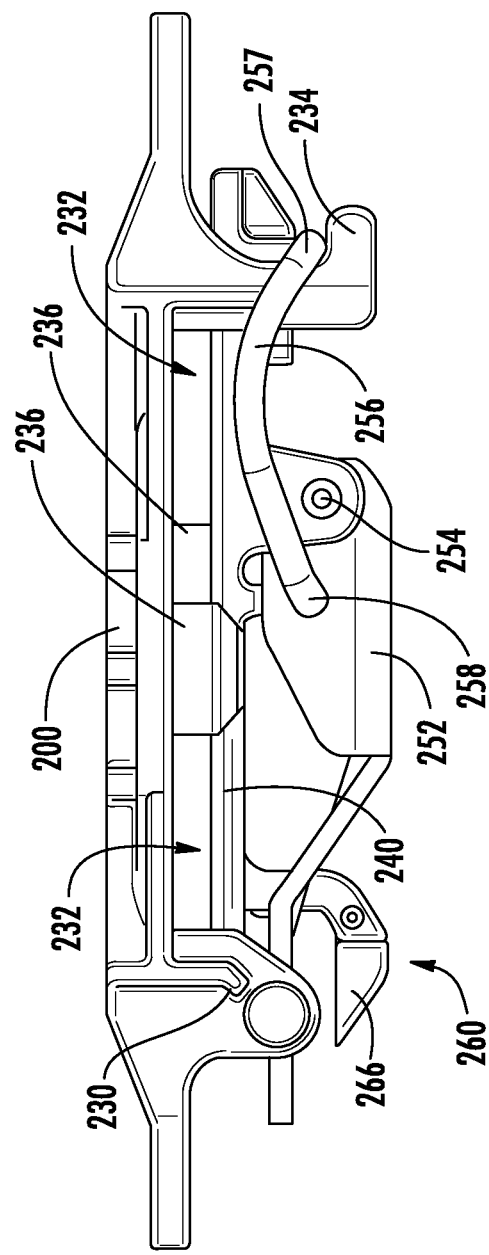
Figure 9:
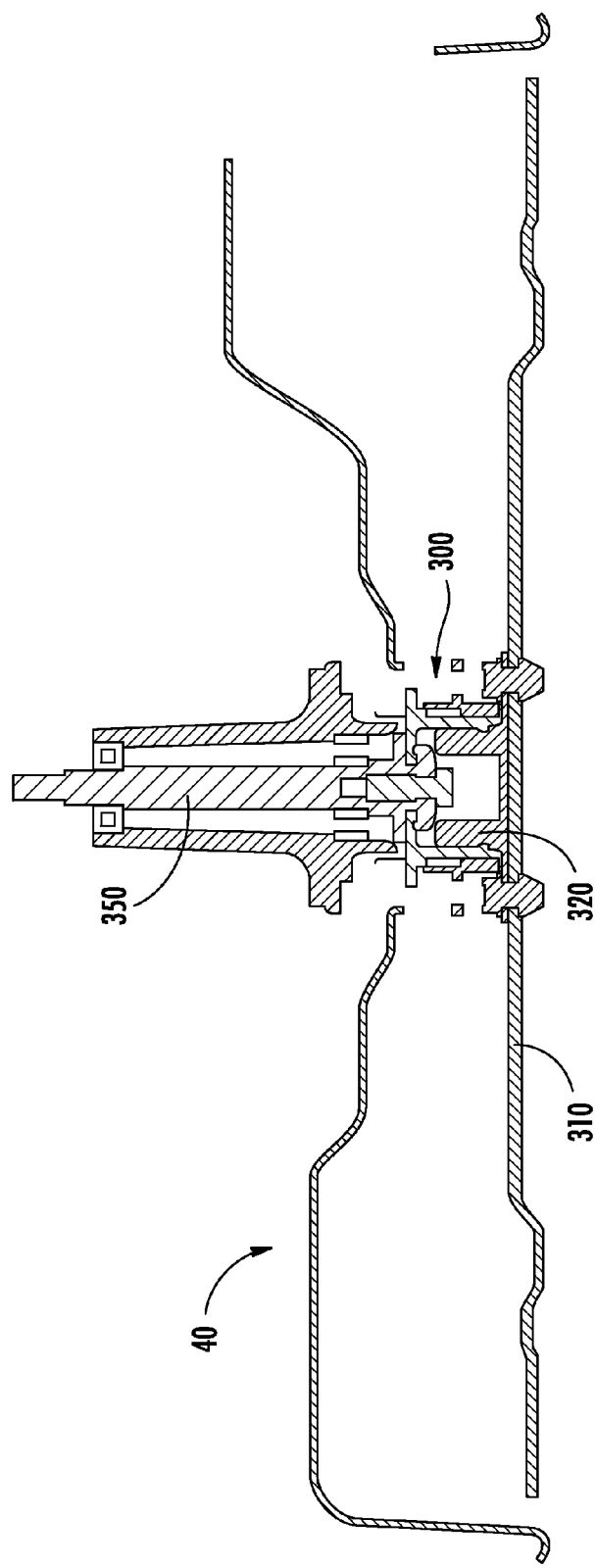
Figure 10:
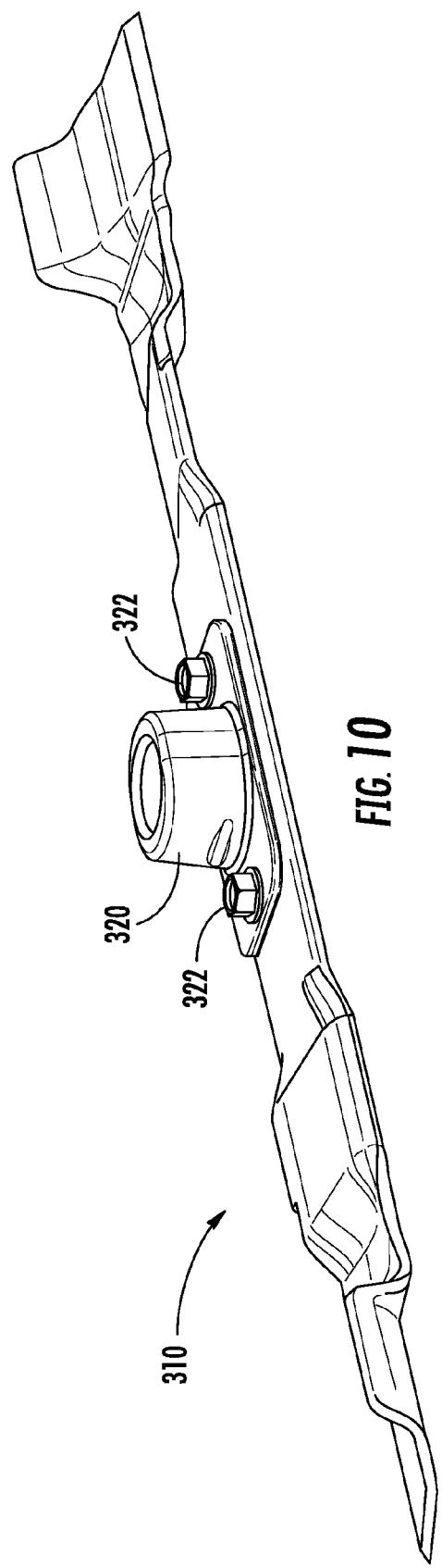
Figure 12:
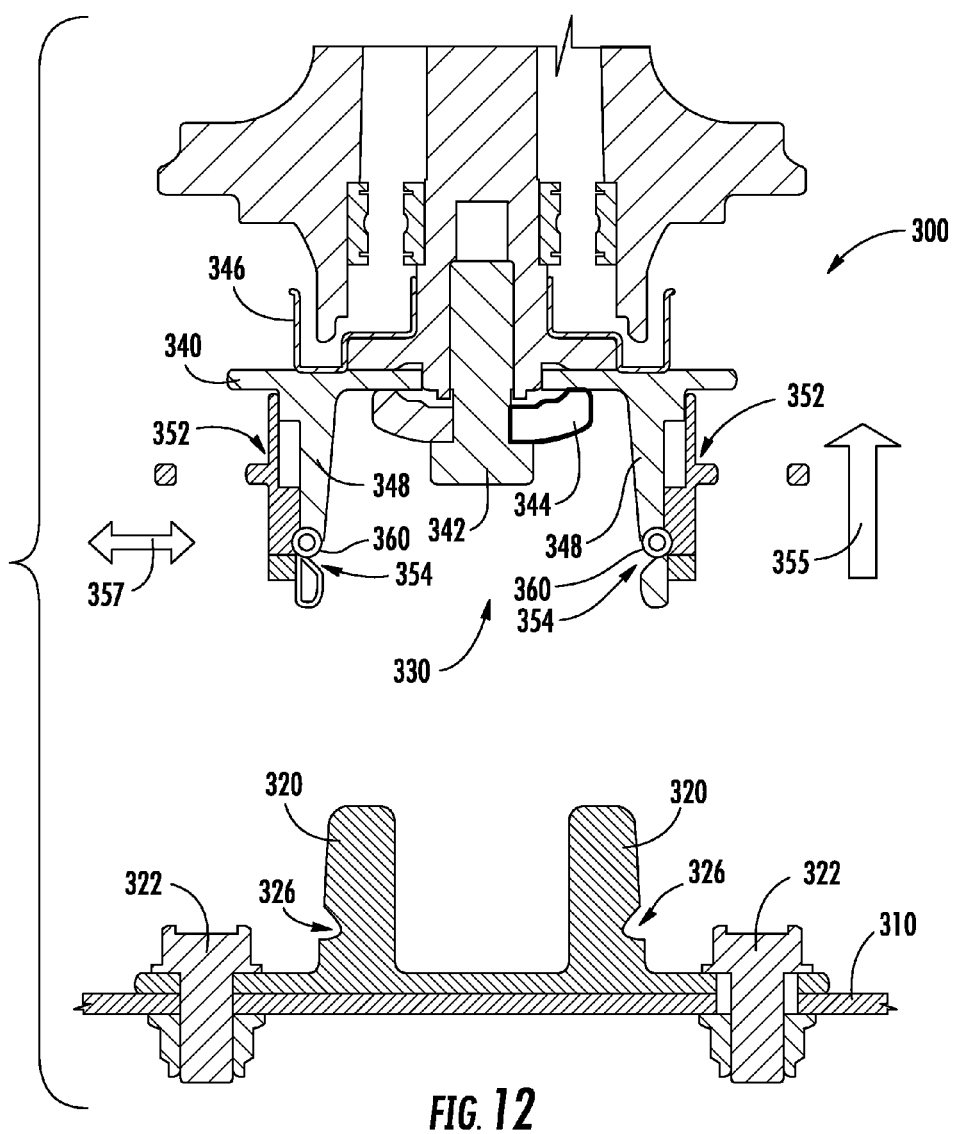
Figure 13:
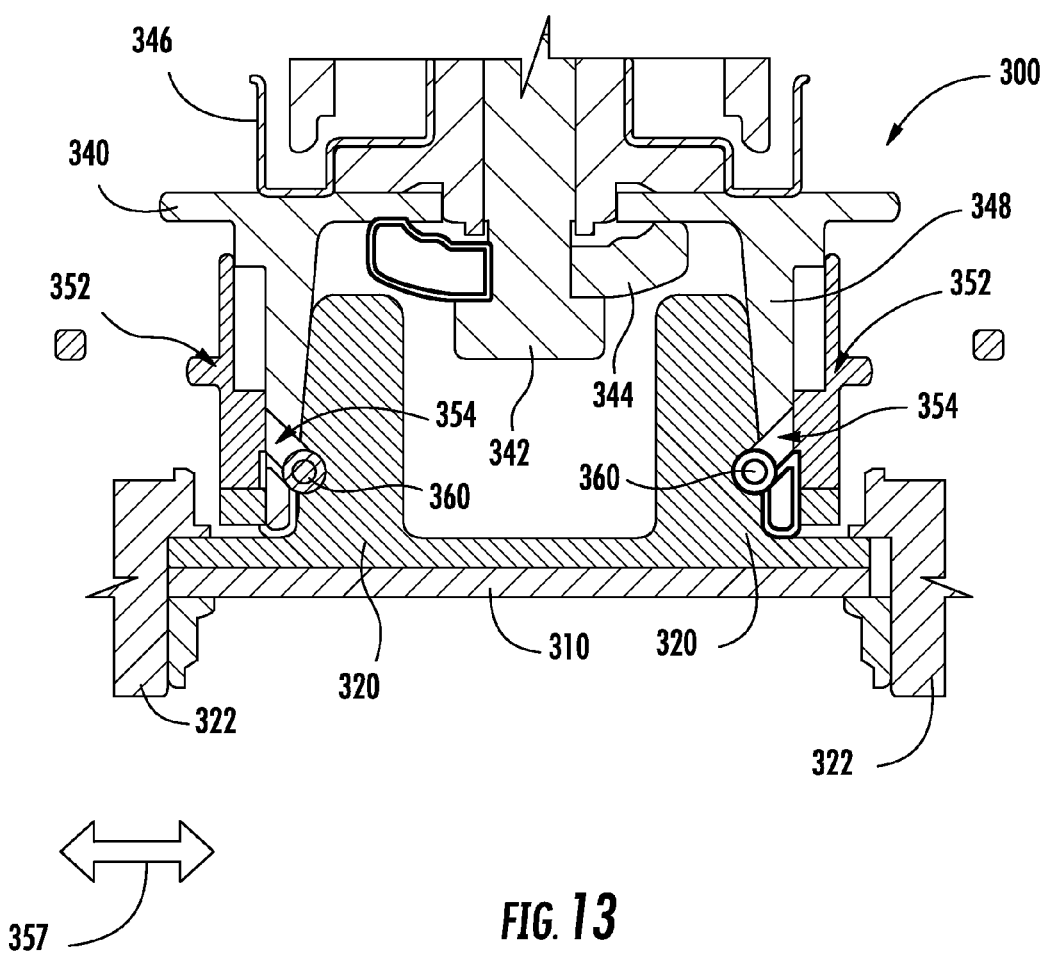
Figure 14A:
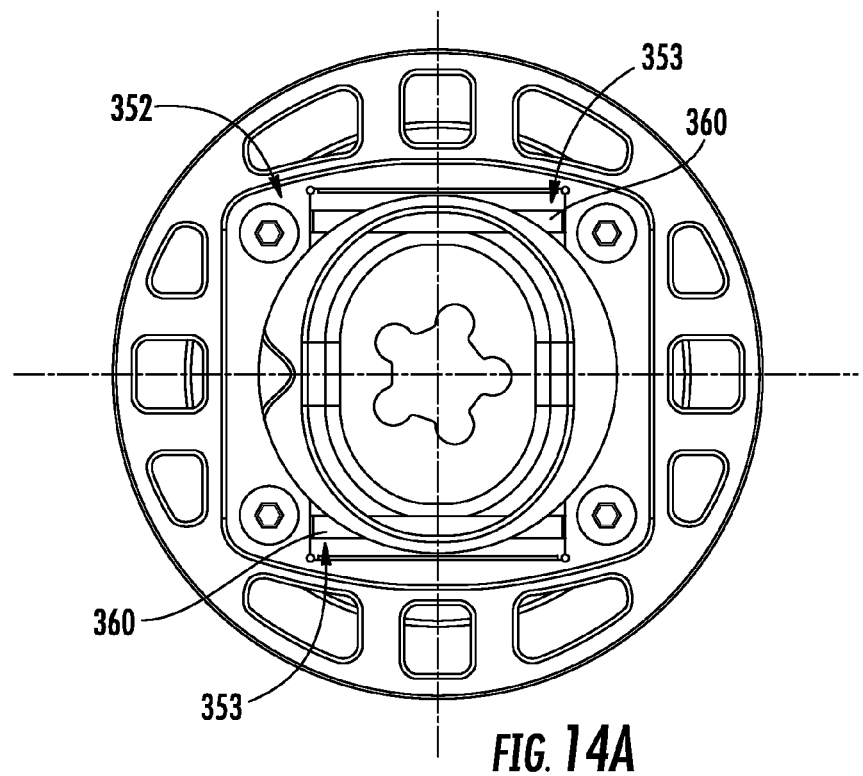
Figure 14B:
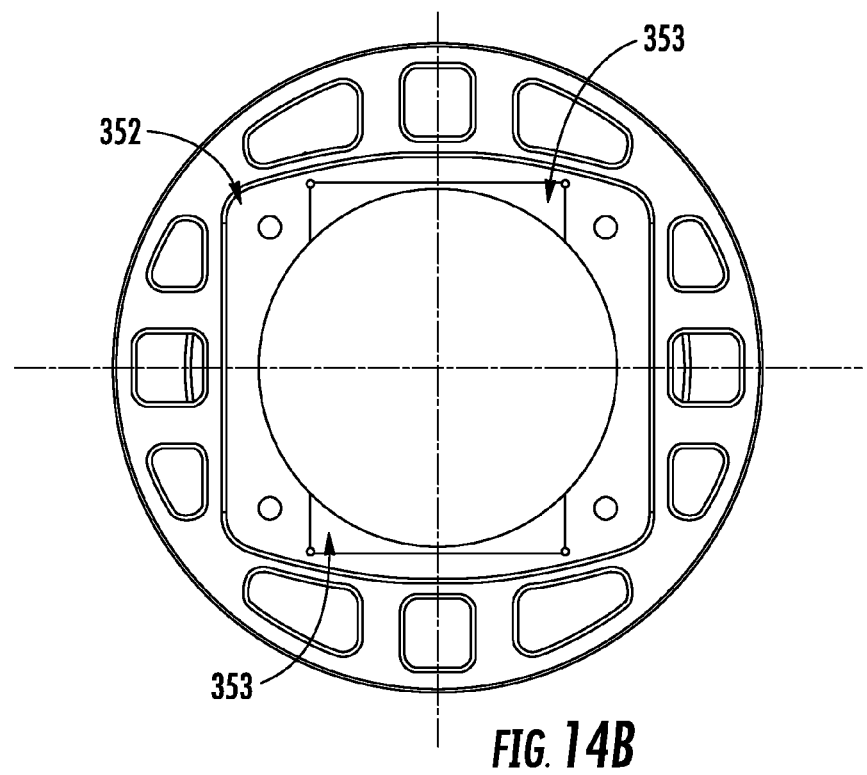
Figure 15:
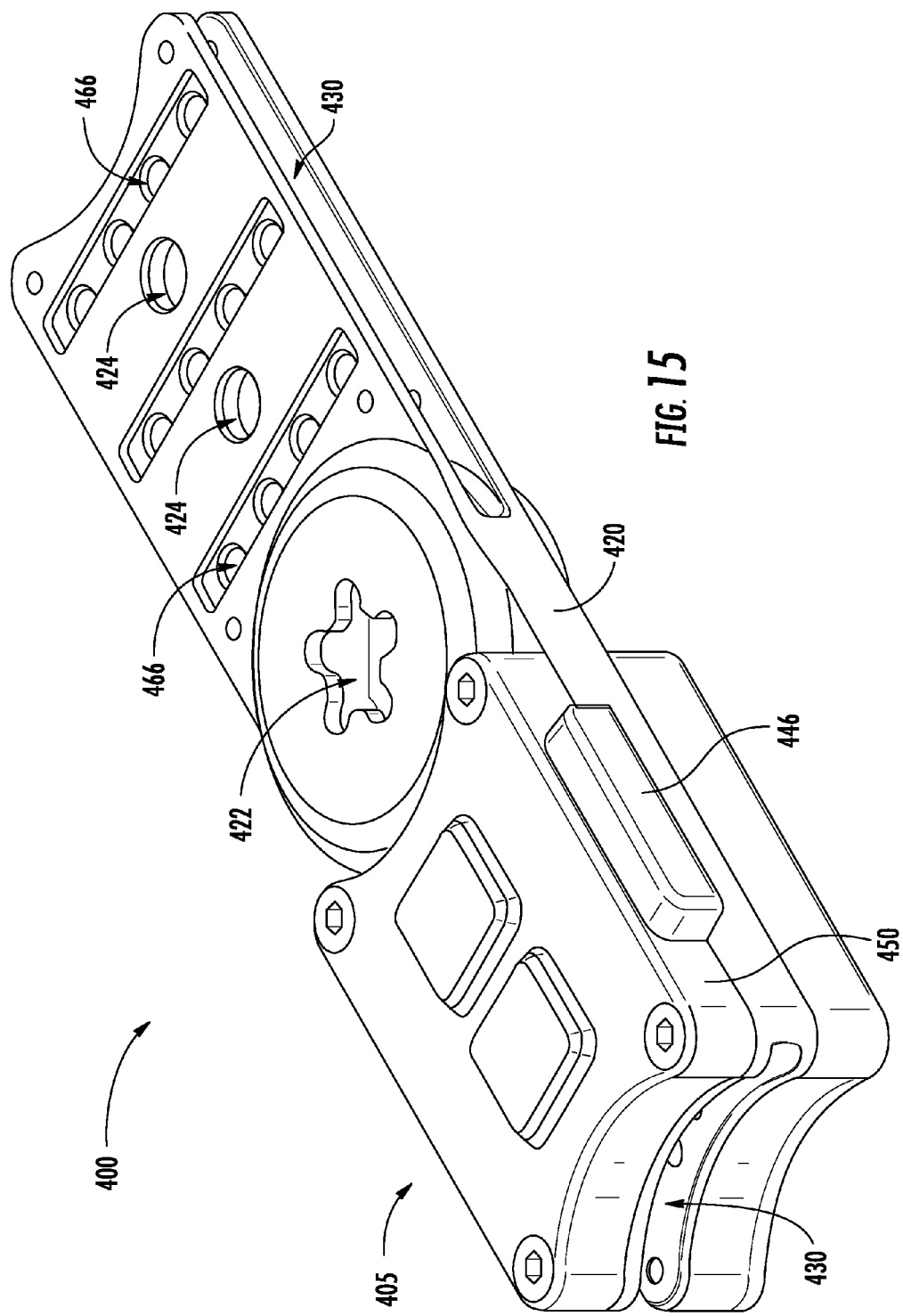
Figure 16:
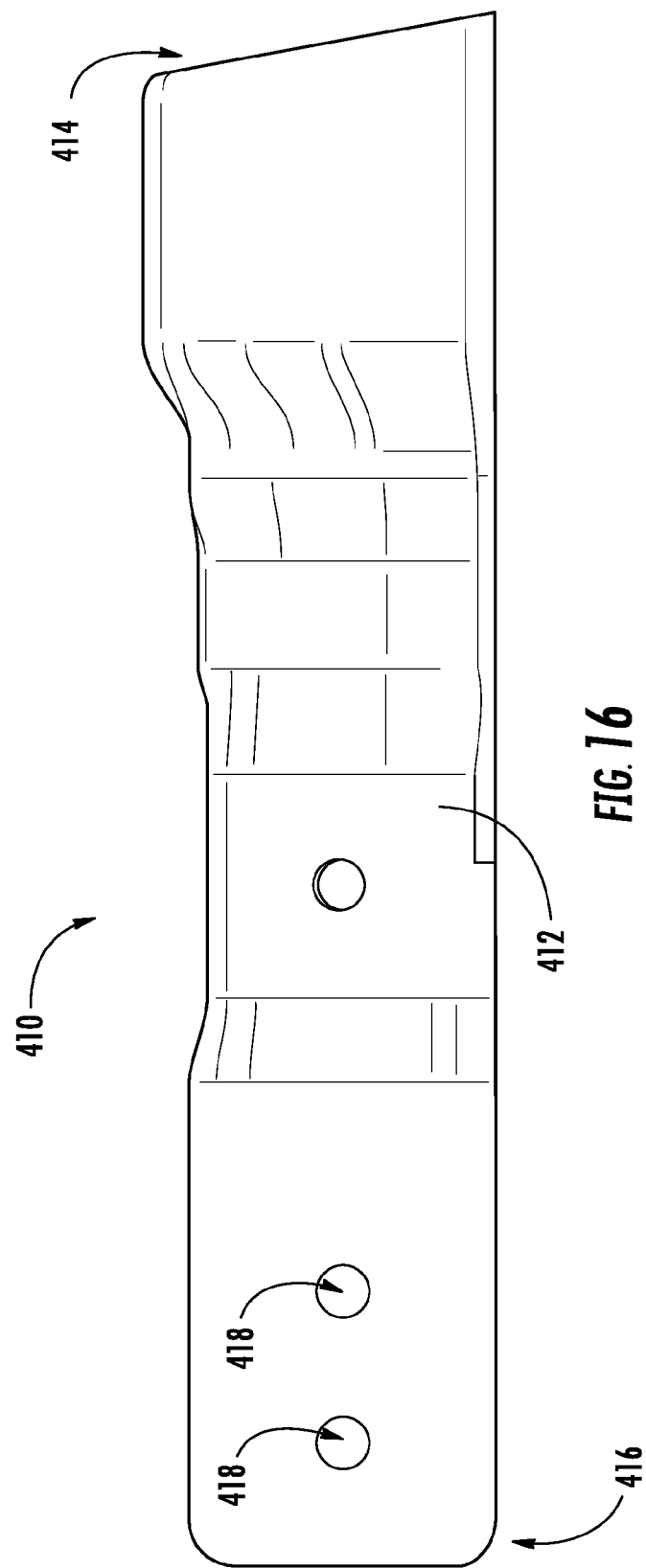
Figure 17:
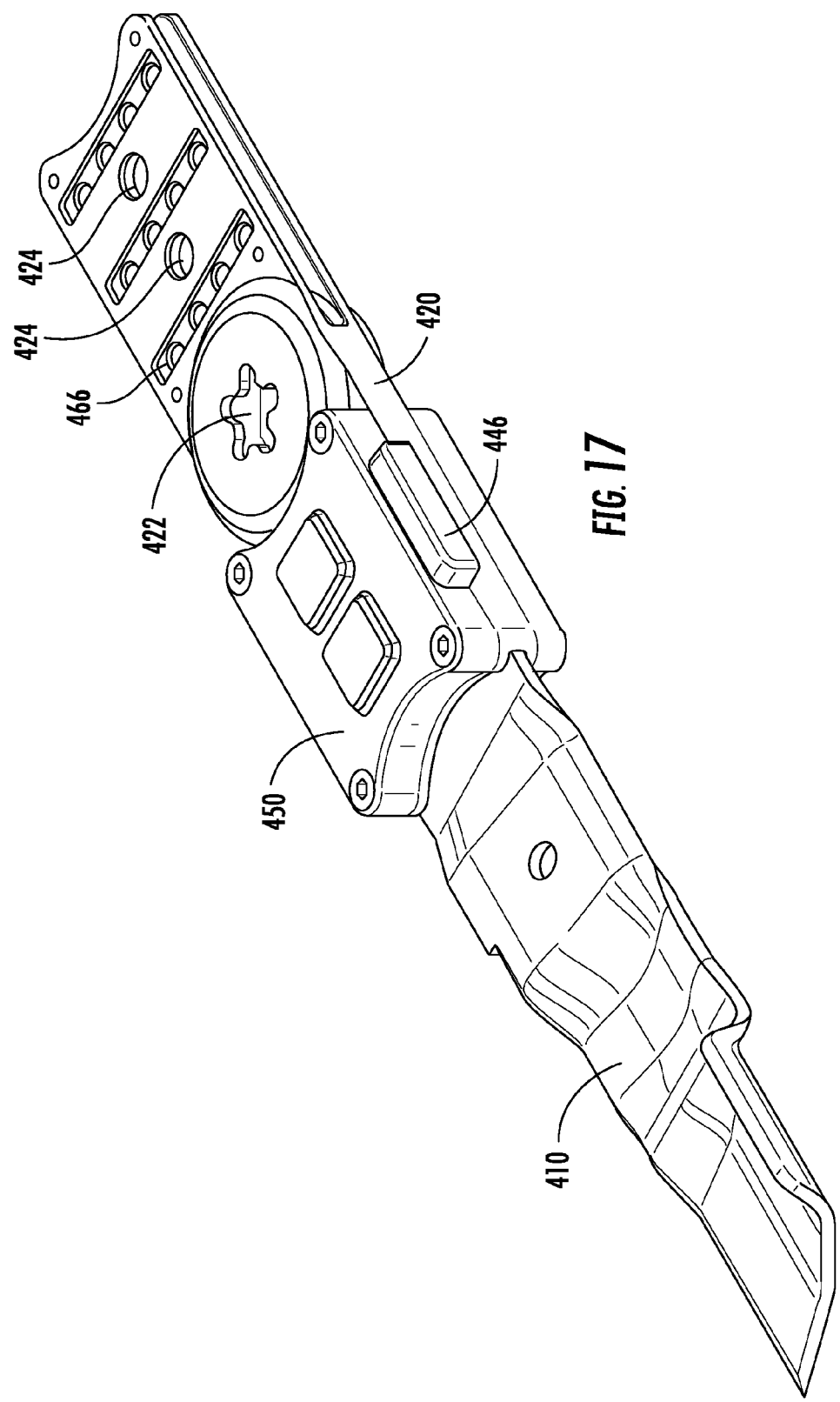
Figure 18:
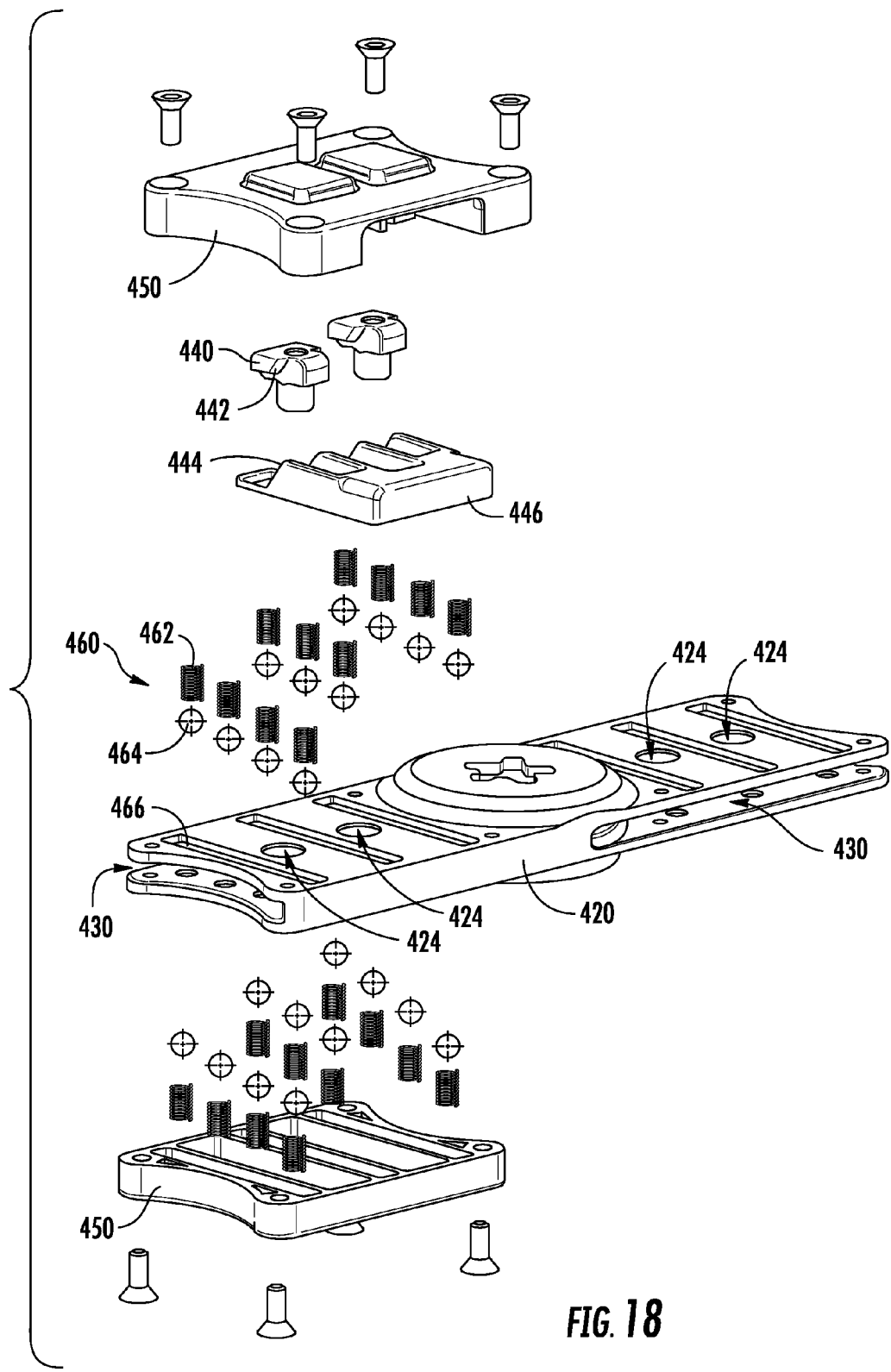
Figure 19:
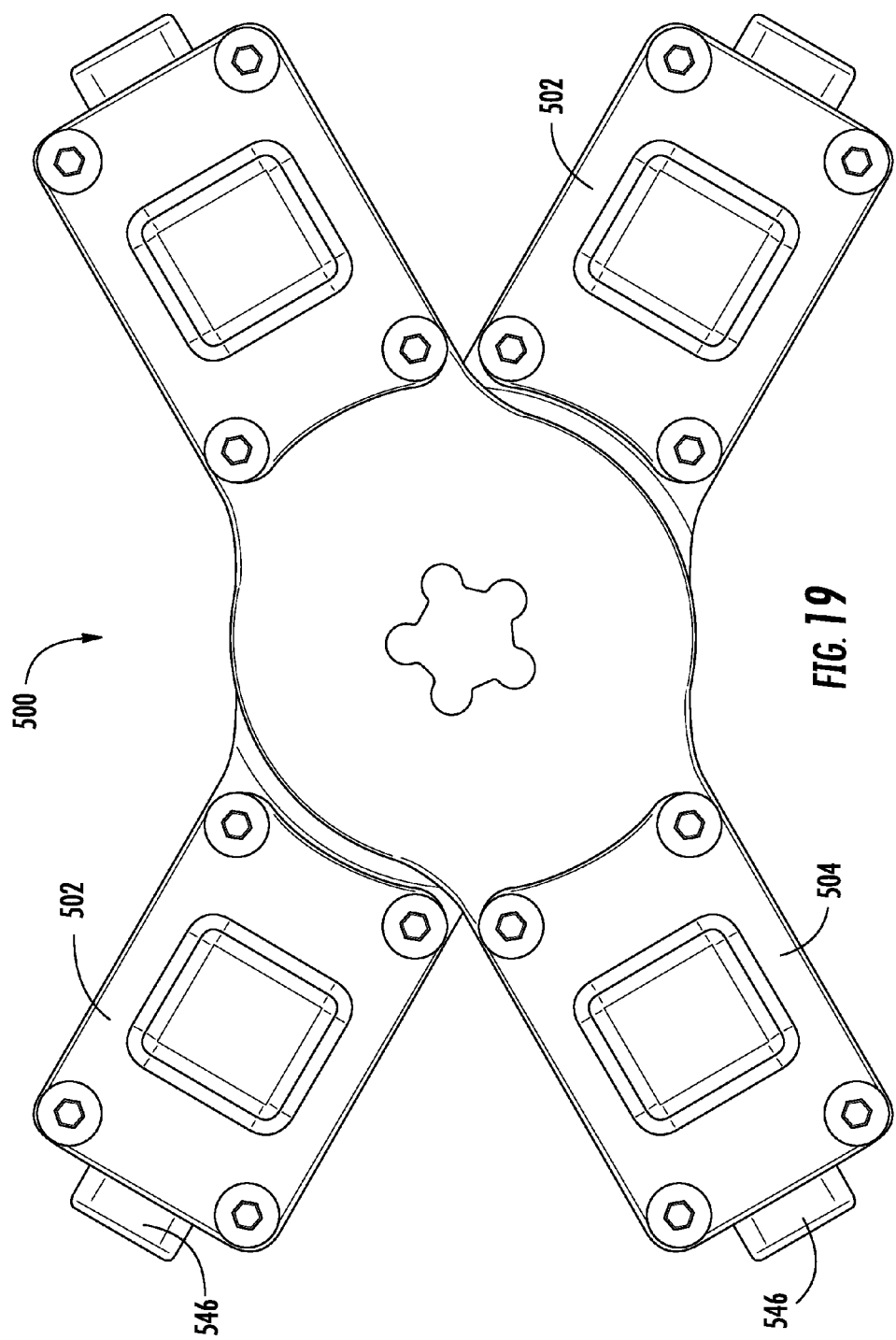
Figure 20:
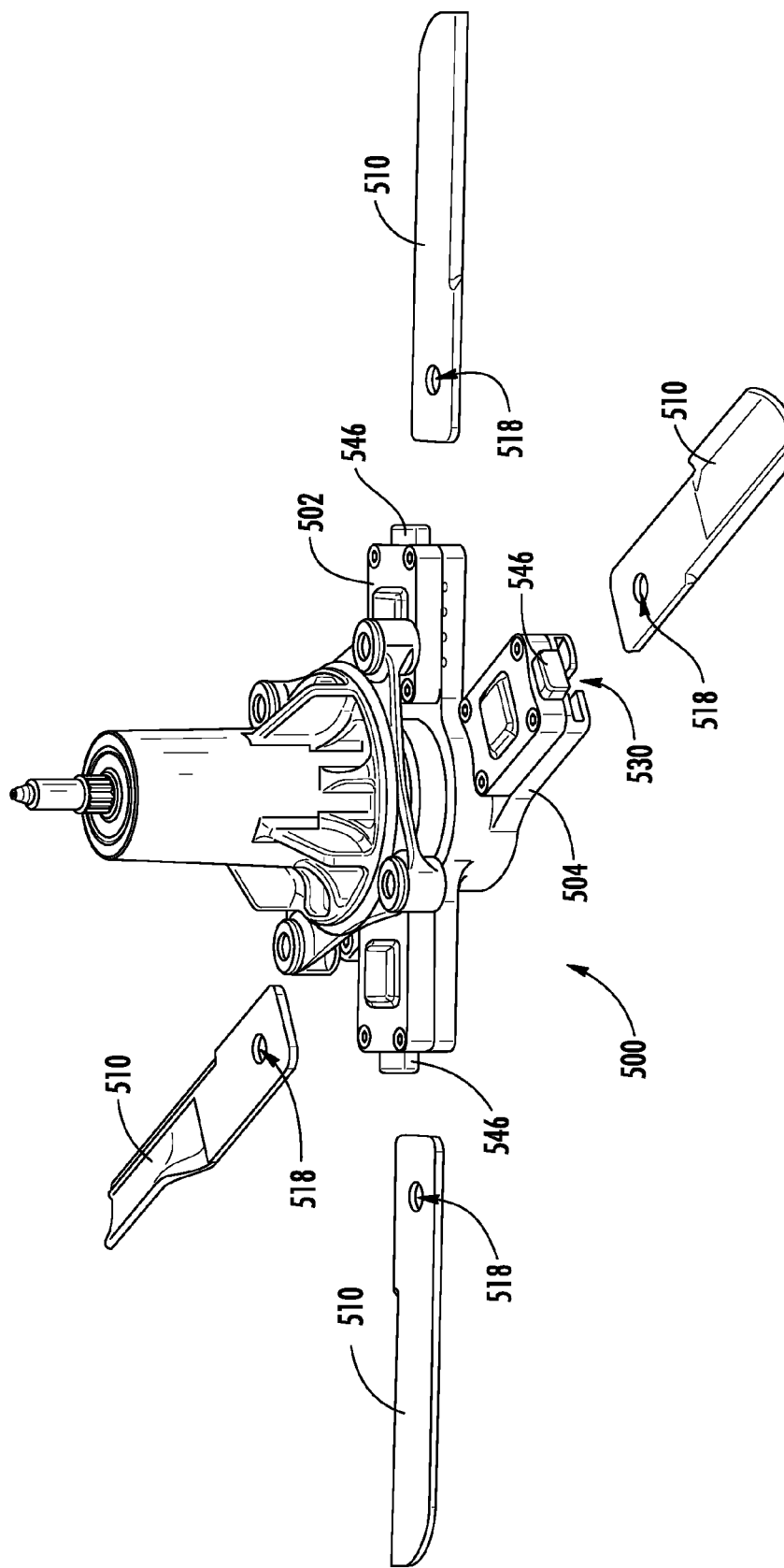
Figure 21:
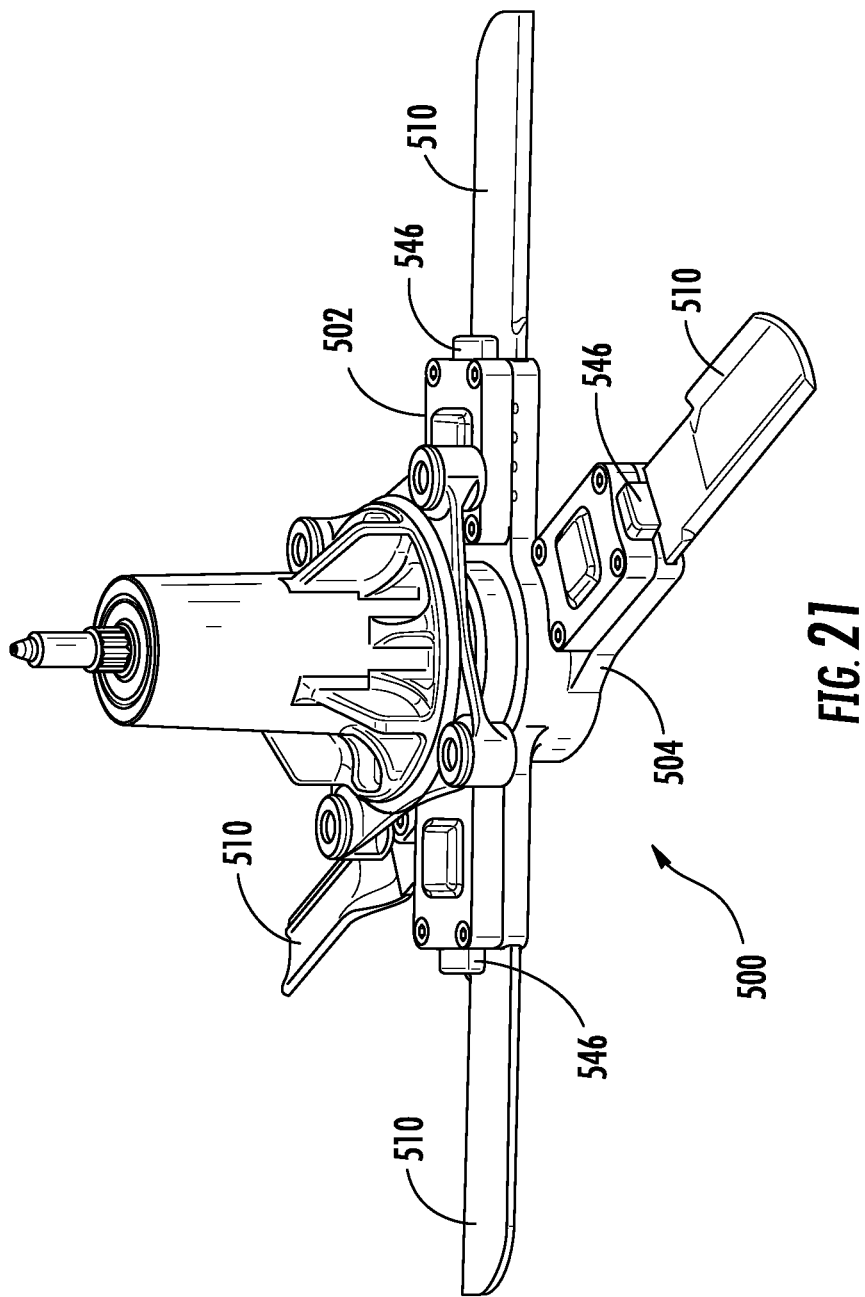

FIG. 6, which includes FIGS. 6A, 6B and 6C, illustrates a top perspective view of the blade of an example embodiment;

FIG. 7, which includes FIGS. 7A and 7B, illustrates a detailed view of one example embodiment of the blade mount base;

FIG. 8 illustrates a side view of the blade mount in the clamped position according to an example embodiment;

FIG. 9 illustrates a cross section of the cutting deck in which a different clamping mechanism is employed according to an example embodiment;

FIG. 10 illustrates a perspective view of a quick change blade according to an example embodiment;

FIG. 11A illustrates a side view of a blade mount seen from a point perpendicular to the longitudinal length of the blade according to an example embodiment;

FIG. 11B illustrates a side view of the blade mount seen looking down the longitudinal length of the blade according to an example embodiment;

FIG. 12 illustrates a cross section view of the blade mount and corresponding portions of the blade with the blade removed according to an example embodiment;

FIG. 13 illustrates a cross section view of the blade mount and corresponding portions of the blade with the blade attached according to an example embodiment;

FIG. 14A is a cross section view looking down into a recess of the blade mount at a level of horizontal channels according to an example embodiment;

FIG. 14B is a cross section view looking in the opposite direction of that shown in FIG. 14A at a level of the horizontal channels according to an example embodiment;

FIG. 15 illustrates a perspective view of a blade mount of an example embodiment;

FIG. 16 illustrates a perspective view of a quick-change blade according to an example embodiment;

FIG. 17 illustrates a perspective view of the blade attached to the blade mount by being clamped within the blade engagement assembly according to an example embodiment;

FIG. 18 illustrates an exploded view of components of the blade engagement assembly according to an example embodiment;

FIG. 19 illustrates a top view of a blade mount according to another example embodiment;

FIG. 20 illustrates a perspective view of the blade mount with quick-change blades removed according to an example embodiment; and FIG. 21 illustrates a perspective view of the blade mount with the blades installed according to an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. Additionally, the term "lawn care" is meant to relate to any yard maintenance activity and need not specifically apply to activities directly tied to grass, turf or sod care. As used herein, operable coupling should be understood to relate to direct or indirect connection that, in either case, enables functional interconnection of components that are operably coupled to each other.

In an example embodiment, a lawn mower is provided with a quick-change blade system. The quick-change blade system may include a mounting apparatus that may take any of a plurality of different forms. Some example mounting apparatus designs are described herein. Although the mounting apparatuses may take different forms, each of the mounting apparatuses may generally provide operators with an ability to relatively easily remove and/or replace lawn mower blades using the mounting apparatus. In some cases, the removal and/or replacement may be performed without any tools and, in some cases, with the use of only one hand. Furthermore, some embodiments may even make it possible for an operator to easily disconnect or connect a blade without requiring jacking up of the lawn mower or removal of the deck since some embodiments may be easy and safe enough to use to allow an operator to reach under a deck and operate the mounting apparatus in a small amount of space or without a direct line of sight.

Some embodiments of the mounting apparatus may be sold as part of the lawn mower either permanently or removably attached to the spindle. However, in other instances, embodiments of the mounting apparatus may be sold separately from the lawn mower and configured to allow older model lawn mowers to be retrofitted with a mounting apparatus of an example embodiment.

Figure 1A:
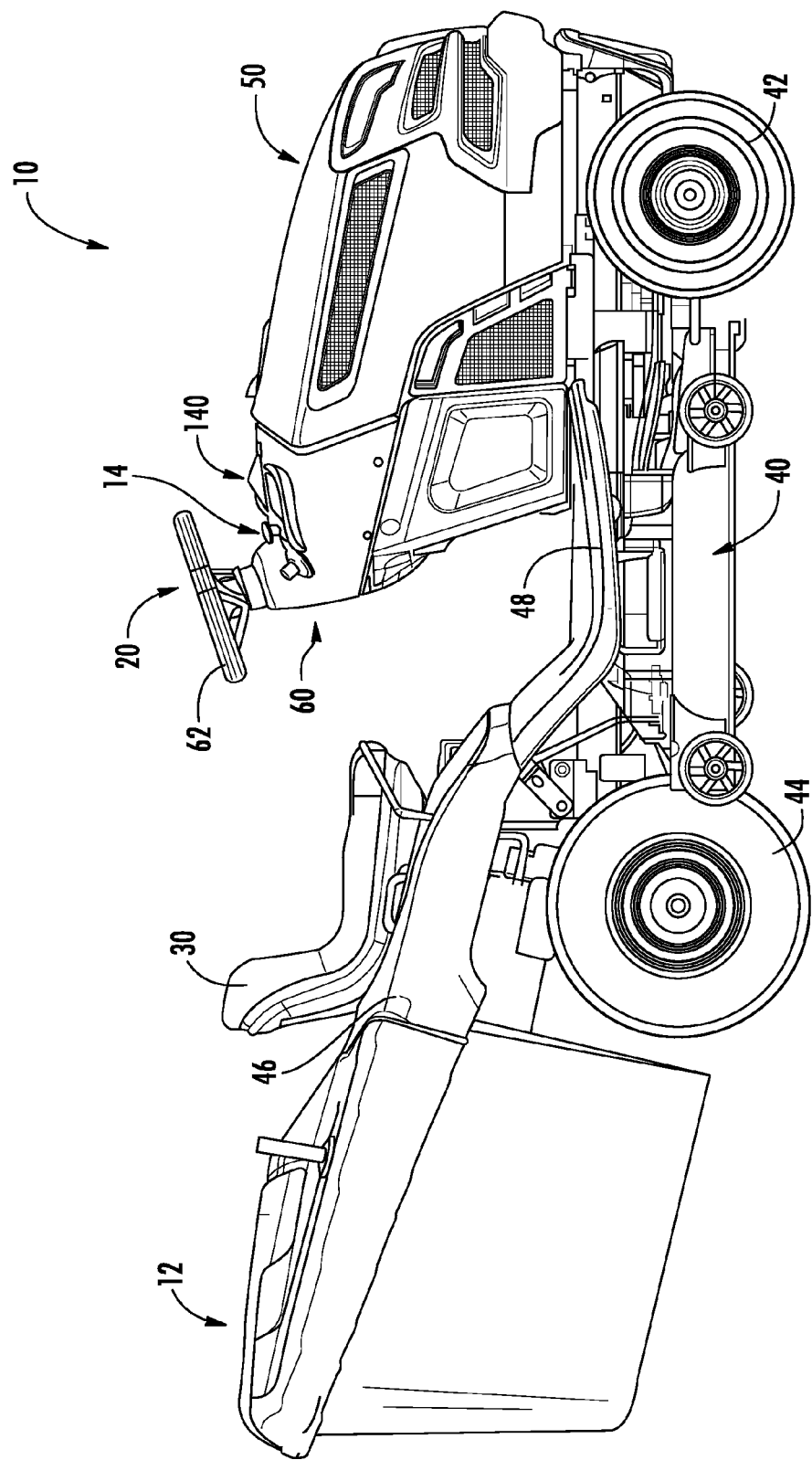
FIG. 1A illustrates a side view of a riding lawn care vehicle according to an example embodiment.
Figure 1B:
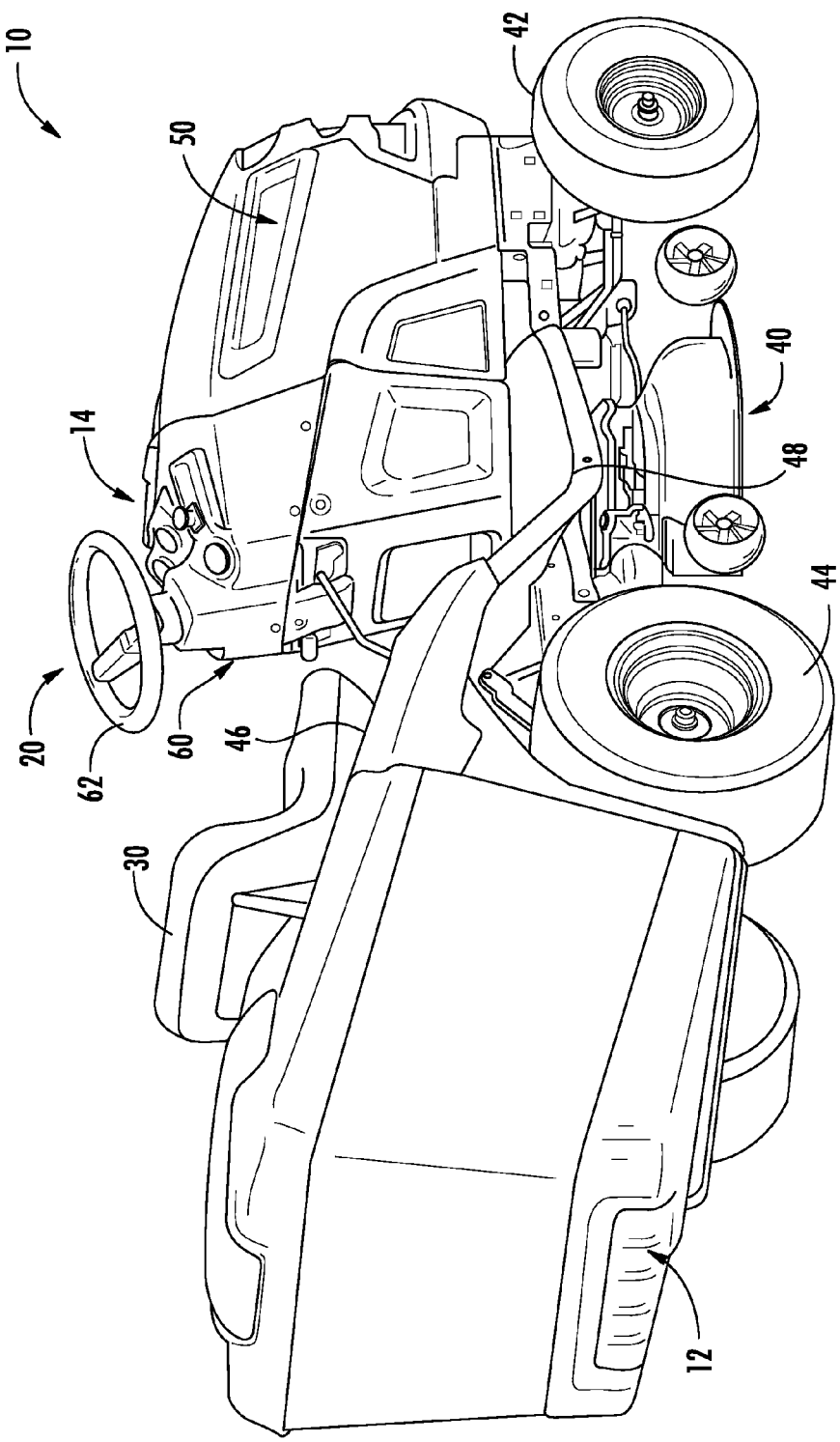
FIG. 1B illustrates a perspective view of the riding lawn care vehicle according to an example embodiment.

FIG. 1, which includes FIGS. 1A and 1B, illustrates an example of a riding lawn care vehicle 10 having a bagging attachment 12. However, it should be appreciated that example embodiments may be employed on numerous other riding lawn care vehicles that may not include a bagging attachment 12. The riding lawn care vehicle 10 may also include an information panel 14 displaying operational information regarding the riding lawn care vehicle 10. As shown and described herein, the riding lawn care vehicle 10 may be a riding lawn mower (e.g., a lawn tractor, front-mount riding lawn mower, zero-turn riding lawn mower, cross mower, stand-on riding lawn mower, and/or the like). However, other example embodiments may be employed on other lawn mowers, such as robotic mowers, walk behind lawn mowers, remote-controlled lawn mowers, and/or the like.

FIG. 1A illustrates a side view of the riding lawn care vehicle 10 and FIG. 1B illustrates a perspective view of the riding lawn care vehicle 10. The riding lawn care vehicle may include a steering assembly 20 (e.g., including a steering wheel, handle bars, or other steering apparatus) functionally connected to wheels of the riding lawn care vehicle 10 to which steering inputs are provided (e.g., the front and/or rear wheels in various different embodiments) to allow the operator to steer the riding lawn care vehicle 10. In some embodiments, the riding lawn care vehicle 10 may include a seat 30 that may be disposed at a center, rear or front portion of the riding lawn care vehicle 10. The operator may sit on the seat 30, which may be disposed to the rear of the steering assembly 20 to provide input for steering of the riding lawn care vehicle 10 via the steering assembly 20.

The riding lawn care vehicle 10 may also include, or be configured to support attachment of, a cutting deck 40 having at least one cutting blade mounted therein. In some cases, a height of the at least one cutting blade may be adjustable by an operator of the riding lawn care vehicle 10. The cutting deck 40 may be a fixed or removable attachment in various different embodiments. Moreover, a location of the cutting deck 40 may vary in various alternative embodiments. For example, in some cases the cutting deck 40 may be positioned in front of the front wheels 42, behind the rear wheels 44, or in between the front and rear wheels 42 and 44 (as shown in FIG. 1) to enable the operator to cut grass using the at least one cutting blade when the at least one cutting blade is rotated below the cutting deck 40. In some embodiments, the cutting deck 40 may be lifted or rotated relative to the lawn mower frame to permit easier access to the underside of the lawn mower without requiring removal of the cutting deck 40. The cutting deck 40 may have one, two, three, or more cutting blades driven by one, two, three, or more rotatable shafts. The shafts may be rotated by any number of mechanisms. For example, in some embodiments the shafts are coupled to a motor via a system of belts and pulleys. In other embodiments the shafts may be coupled to the motor via a system of universal joints, gears, and/or other shafts. In still other embodiments, such as in an electric lawn mower, the shaft may extend directly from an electric motor positioned over the cutting deck.

In some embodiments, the front wheels 42 and/or the rear wheels 44 may have a shielding device positioned proximate thereto in order to prevent material picked up in the wheels from being ejected toward the operator. Fender 46 is an example of such a shielding device. When operating to cut grass, the grass clippings may be captured by a collection system (e.g., bagging attachment 12), mulched, or expelled from the cutting deck 40 via either a side discharge or a rear discharge.

The riding lawn care vehicle 10 may also include additional control related components such as one or more speed controllers, cutting height adjusters and/or the like. Some of the controllers, such as the speed controllers, may be provided in the form of foot pedals that may sit proximate to a footrest 48 (which may include a portion on both sides of the riding lawn care vehicle 10) to enable the operator to rest his or her feet thereon while seated in the seat 20.

In the pictured example embodiment of FIG. 1, an engine 50 of the riding lawn care vehicle 10 is disposed substantially forward of a seated operator. However, in other example embodiments, the engine 50 could be in different positions such as below or behind the operator. In some embodiments, the engine 50 may be operably coupled to one or more of the wheels of the riding lawn care vehicle 10 in order to provide drive power for the riding lawn care vehicle 10. In some embodiments, the engine 50 may be capable of powering two wheels, while in others, the engine 50 may power all four wheels of the riding lawn care vehicle 10. Moreover, in some cases, the engine 50 may manually or automatically shift between powering either two wheels or all four wheels of the riding lawn care vehicle 10. The engine 50 may be housed within a cover that forms an engine compartment to protect engine 50 components and improve the aesthetic appeal of the riding lawn care vehicle 10.

In an example embodiment, the engine compartment may be positioned proximate to and/or mate with portions of a steering assembly housing 60. The steering assembly housing 60 may house components of the steering assembly 20 to protect such components and improve the aesthetic appeal of the riding lawn care vehicle 10. In some embodiments, a steering wheel 62 of the steering assembly 20 may extend from the steering assembly housing 60 and a steering column (not shown) may extend from the steering wheel 62 down through the steering assembly housing 60 to components that translate inputs at the steering wheel 62 to the wheels to which steering inputs are provided.

In some embodiments, the engine 50 may also provide power to turn the cutting blade or blades disposed within the cutting deck 40. In this regard, for example, the engine 50 may be used to turn a shaft upon which the cutting blade or blades may be fixed (e.g., via a belt and pulley system and/or other mechanisms). The turning of the shaft, at high speeds, may move the cutting blade or blades through a range of motion that creates air movement that tends to straighten grass for cutting by the moving blade and then eject the cut grass out of the cutting deck 40 (e.g., to the bagging attachment 12 or to the back or side of the riding lawn care vehicle 10), unless the blade and mower are configured for mulching.

Figure 2:
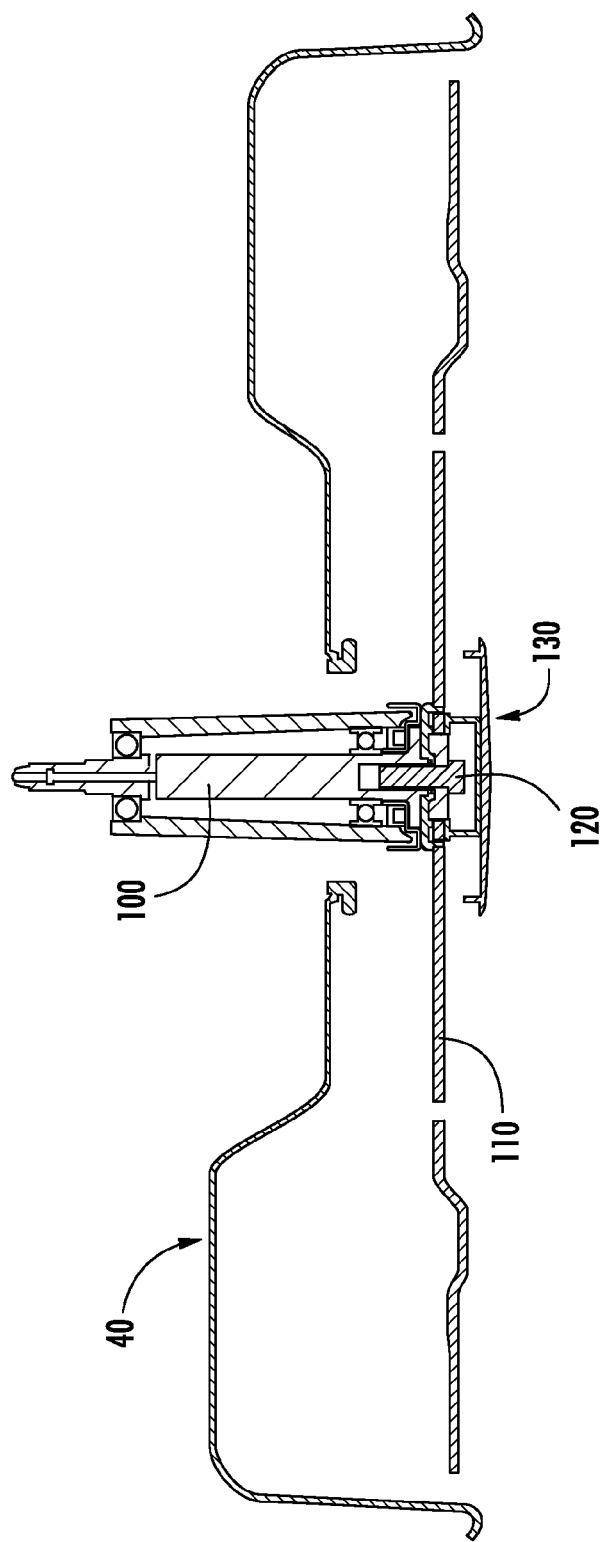
FIG. 2 illustrates a cross section view taken through a center of a cutting deck of the riding lawn care vehicle according to an example embodiment.

FIG. 2 illustrates a cross section view taken through a center of the cutting deck 40. As can be seen in FIG. 2, shaft 100 (often also referred to as a spindle) may extend downward into a center region of the cutting deck 40. A blade 110 may be attached to the shaft 100. Conventionally, the blade 110 may be directly attached to the shaft 100 via an attachment device such as, for example, bolt 120. In this regard, for example, the bolt 120 may pass through an opening in a center of the blade 110 and thereafter be screwed into a distal end of the shaft 100 (e.g., with or without a washer between the bolt 120 and the blade 110). Thus, blade removal would require the bolt 120 to be removed. This, of course would require the use of tools, and may require tipping, removal or elevation of the cutting deck 40.

Some example embodiments may provide for the inclusion of a mounting apparatus (e.g., blade mount 130), which may enable the blade 110 to be removed without tools and, in some cases, without requiring tipping, removal or elevation of the cutting deck 40. The blade mount 130 may be operably coupled to the shaft 100. For example, the blade mount 130 may be directly affixed to the shaft 100 via the bolt 120. In this regard, for example, the bolt 120 may pass through an opening in a center portion of the blade mount 130 (e.g., with or without a washer between the bolt 120 and the blade 110) and may be tightened to affix the blade mount 130 to the shaft 100.

Figure 3A:
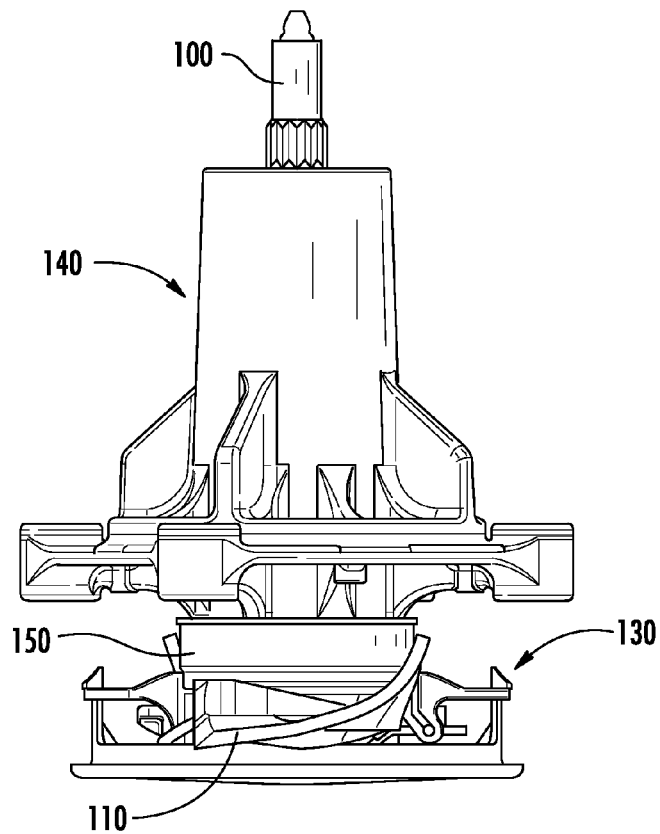
FIG. 3A illustrates a side view of a blade mount looking down a longitudinal length of a blade according to an example embodiment.
Figure 3B:
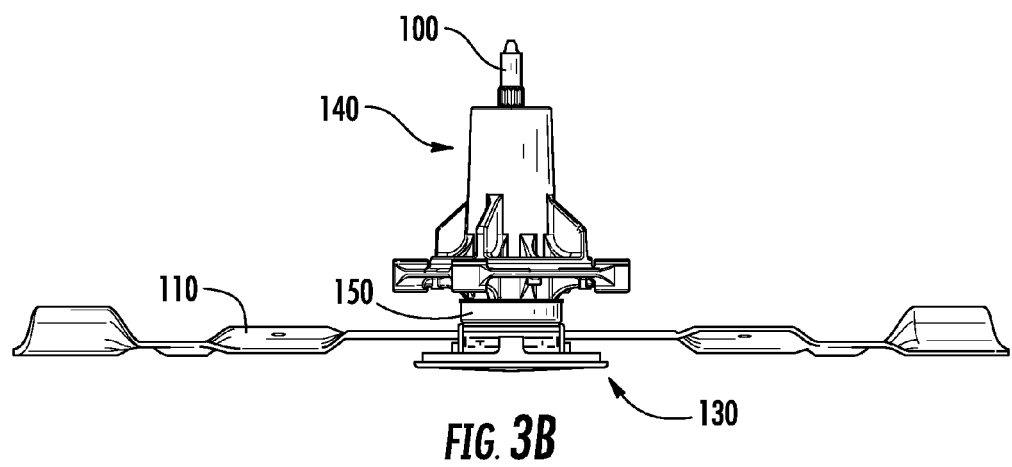
FIG. 3B illustrates a side view of the blade mount from a position perpendicular to the longitudinal length of the blade according to an example embodiment.

FIG. 3, which includes FIGS. 3A and 3B, shows isolated views of components associated with the blade mount 130 according to an example embodiment. In this regard, FIG. 3A illustrates a side view looking down the longitudinal length of the blade 110 and FIG. 3B illustrates a side view from a position perpendicular to the longitudinal length of the blade 110. FIG. 3 illustrates a portion of the shaft 100 passing into a housing 140 that may protect the shaft 100 from debris that may impact the rotatability of the shaft 100. The shaft 100 may terminate at a mounting plate 150 to which the blade mount 130 may be attached, or against which the blade mount 130 may be drawn by tightening of the bolt 120 to the shaft 100.

Figure 4:
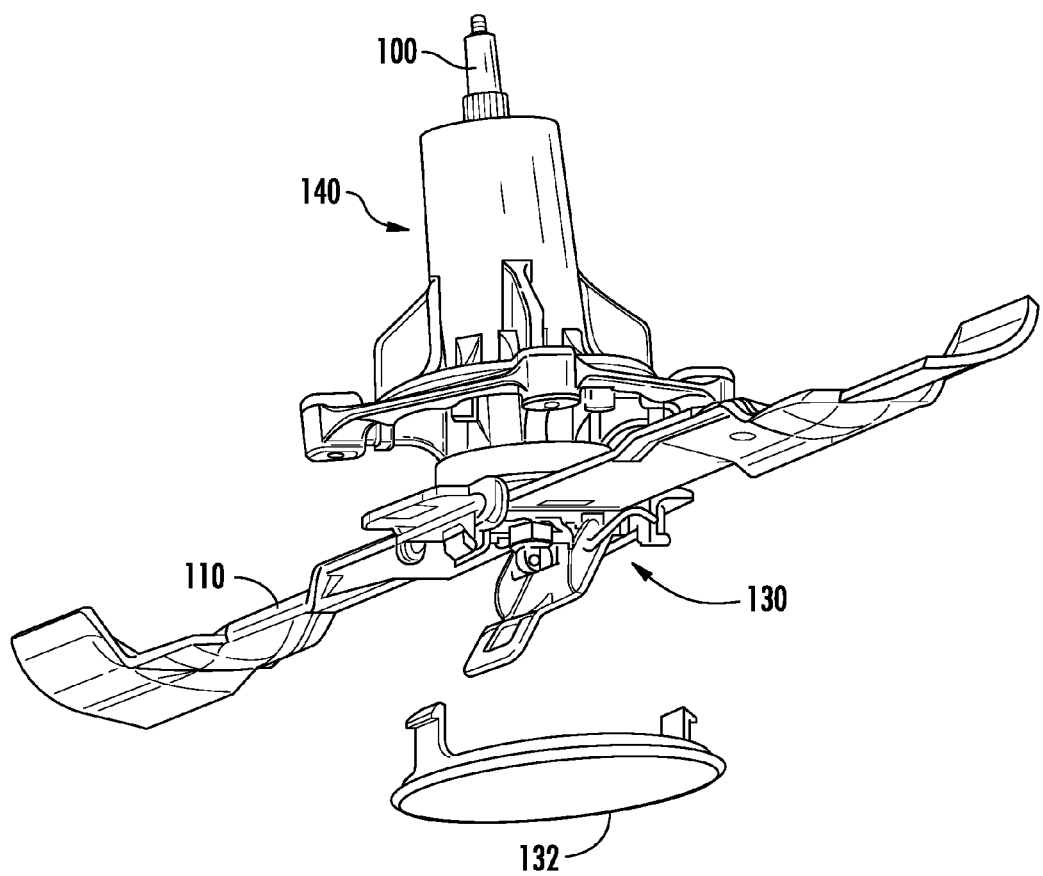
FIG. 4 illustrates a perspective view of components associated with the blade mount employing a covering according to an example embodiment.

In some embodiments, the blade mount 130 may include a covering that may be provided to shield the blade mount 130 from debris during operation. FIG. 4 illustrates a perspective view of components associated with the blade mount 130 employing a covering according to an example embodiment. In this regard, FIG. 4 shows a blade mount cover 132 removed from the blade mount 130. The blade mount cover 132 may be a plate shaped piece of metal, plastic or other rigid material that may be affixed (e.g., via a snap assembly) over the blade mount 130. However, it should be appreciated that the blade mount cover 132 may be optional, and thus some embodiments may not include the blade mount cover 132.

Figure 5:
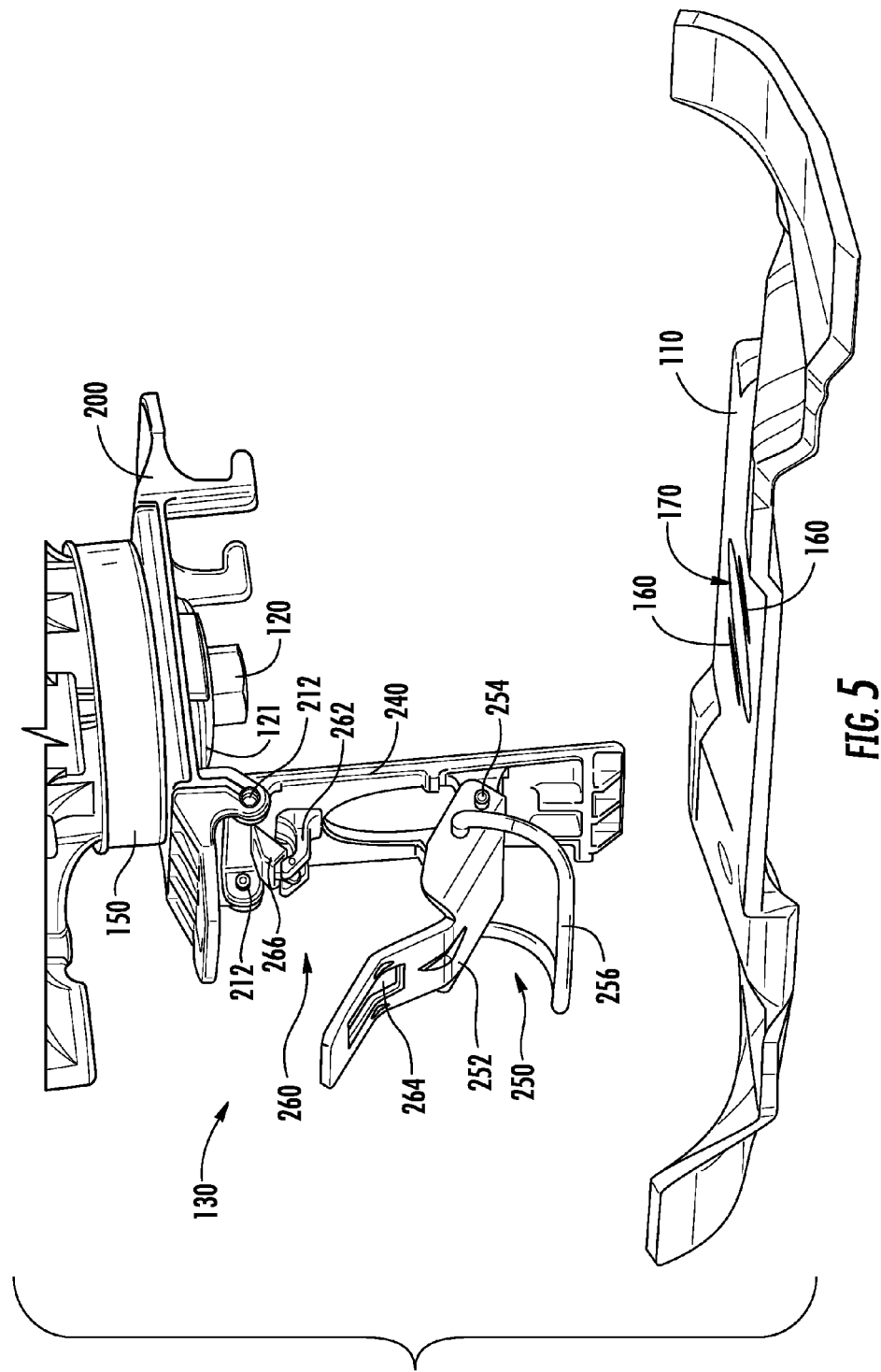
FIG. 5 illustrates an example embodiment of the blade mount showing a spring clamp design where the blade mount is released and the blade is removed according to an example embodiment.

The blade mount 130 of an example embodiment may include a spring clamp design. FIG. 5 illustrates an example embodiment of the blade mount 130 showing the spring clamp design where the blade mount 130 is released and the blade 110 is removed. FIG. 6, which includes FIGS. 6A, 6B and 6C, illustrates a top view of the blade 110 of an example embodiment. FIG. 6A illustrates a top view of the blade 110. FIG. 6B illustrates a top perspective view of a version of the blade 110 that may be used in connection with a blade mount employing a stamped blade mount base (e.g., like the one shown in FIG. 7B). FIG. 6C illustrates a top perspective view of a version of the blade 110 that may be used in connection with a blade mount employing a cast blade mount base (e.g., like the one shown in FIG. 7A). As shown in FIG. 6, the blade 110 may include alignment slots 160 and a bolt receiver 170. The bolt receiver 170 may be a cutout portion disposed at a center of the blade 110 (e.g., centered around an intersection of the longitudinal and transverse centerlines of the blade 110) to allow the blade 110 to fit within the blade mount 130 without having interference from the bolt 120. In other words, the bolt receiver 170 may pass from a top face of the blade 110 to a bottom face of the blade 110 at the axis of rotation of the blade 110 to define a gap through which the bolt 120 may pass to enable the blade 110 to first snugly within the blade mount 130 even though the bolt 120 may also protrude into the blade mount 130. In some cases, there may be no force exerted by the bolt 120 on the blade 110 (and in some cases there may be no contact between the bolt 120 and the blade 110) due to the bolt 120 fitting within the bolt receiver 170. The alignment slots 160 and the bolt receiver 170 may be employed for attachment of the blade 110 to the blade mount 130 as described below. In this regard, the alignment slots 160 (or at least one alignment slot) may form a cutout portion of the blade 110 passing from one of the top face or bottom face toward the other of the top face or the bottom face. Moreover, the at least one alignment slot may disposed spaced apart from an axis of rotation of the blade to receive a corresponding protruding member of a blade mount configured to hold the blade at a portion of the blade other than at the axis of rotation during rotation of the blade responsive to operation of the lawn mower. The blade mount 130 may include a blade mount base 200 that may form a portion of the blade mount 130 to which a clamping device or component (e.g., a spring clamp) is attached. FIG. 7, which includes FIGS. 7A and 7B, illustrates a detailed view of two alternative example embodiments of the blade mount base. In this regard, FIG. 7A illustrates an example embodiment in which the blade mount base 200 is cast as a single unitary piece, while FIG. 7B illustrates an example embodiment in which blade mount base 200' is stamped from a single unitary piece of metal.

Referring primarily to FIGS. 5, 6 and 7, the blade mount 130 of this example embodiment may include the blade mount base 200 which may be rotatably attached to a clamp 240 via pivot pins 212 (or a single pivot pin) that may fit within pivot pin receivers 202 disposed at a portion of the blade mount base 200. The blade mount base 200 may further include an attachment orifice 220 that may be disposed at a center portion of the blade mount base 200. In FIG. 7A, the attachment orifice 220 is shown to have a star pattern in order to receive a correspondingly patterned protrusion that may extend beyond the surface of the mounting plate 150. However, it should be appreciated that any circular or non-circular pattern could be employed on the mounting plate 150 and the attachment orifice 220. The bolt 120 may pass through the attachment orifice 220 to engage the shaft 100 to secure the blade mount base 200 to the mounting plate 150 responsive to tightening of the bolt 120. In some cases, a washer 121 or other intermediate plate shaped component may be disposed between the bolt 120 and the surface of the blade mount base 200 surrounding the attachment orifice 220.

In some embodiments, the pivot pin receivers 202 may be disposed in guide posts 230 that may form one edge of a blade reception channel 232 at a surface of the blade mount base 200. A locking post 234 may be disposed at an opposite side of the blade reception channel 232 relative to each respective one of the guide posts 230. The blade reception channel 232 may include alignment protrusions 236 that may be disposed on opposite sides of the attachment orifice 220. In some embodiments, the alignment protrusions 236 may protrude into the blade reception channel 232 from the blade mount base 200 to project into the alignment slots 160 of the blade 110. To ensure that the blade 110 cannot be installed incorrectly, the alignment protrusions 236 and the alignment slots 160 may be offset to opposite sides relative to a centerline of the longitudinal length of the blade 110. In an example embodiment, the alignment protrusions 236 may have a height that is approximately equal to the thickness of the blade 110 so that the tops of the alignment protrusions are flush with the surface of the blade 110 when the blade 110 is properly positioned in the blade reception channel 232. In some cases, the blade mount base 200 may further include cover snap receivers 238 configured to receive snap fittings associated with the blade mount cover 132 (if employed). In the illustrated embodiment, the blade mount base 200 includes two snap receivers 238, one on each side of the blade reception channel 232 and located far enough from the blade reception channel so that clamp 240 does not interfere with the latch snap fittings on the blade mount cover 132.

In an example embodiment, the clamp 240 may be operably coupled to the blade mount base 200 via the pivot pins 212. The clamp 240 may be rotatable with the pivot pins forming the axis of rotation and may be lockable via engagement of a latch assembly 250 onto the locking posts 234. The latch assembly 250 may include a latch cover 252 that rotates about a roll pin 254 to enable engagement and/or disengagement of a wire element 256 that may be rotatably attached to the latch cover 252 at a portion of the latch cover 252 that is offset from a position at which the roll pin 254 engages the latch cover 252. The wire element 256 may be bent as it extends from the point of engagement of the wire element 256 to the latch cover 252 to a crossbar portion of the wire element 256 that engages the locking posts 234. The bend in the wire element 256 may enable the wire element 256 to provide a spring-like force to pull the latch cover 252 down toward the clamp 240 when the latch cover 252 is rotated about the roll pin 254 while the wire element 256 engages the locking posts 234.

More specifically, FIG. 8 illustrates a side view of the blade mount 130 in the clamped position according to an example embodiment. When viewing the blade mount 130 from the perspective shown in FIG. 8, one can imagine a plane extending through the point 257 where the wire element 256 is secured in the locking posts 235 and through the center of the roll pin 254. When the latch cover 252 is in unlatched position, the point 258 where the wire element 256 is rotatably coupled to the latch cover 252 is below this plane. When the latch cover 252 is rotated about the roll pin 254 towards a latched position, the point 258 moves around the roll pin 254 until it passes through the plane. The point 258 then resides above the plane when the latch cover 252 is in the latched position. In order for the latch cover 252 to move out of the latched position, the point 258, which rotates in a circular motion about the center of the roll pin 254, must move further away from the point 257 until it passes through the plane. The bend in the wire element 256 permits the point 258 to move further away from point 257 to some extent, but only when the spring force is overcome by, for example, the force exerted by the hand of an operator trying to unlock the latch cover 252. In this way, the latch cover 252 is held in the latched position and the clamp 240 is locked into the clamped position shown in FIG. 8. In one embodiment, the point 257 is slightly higher than the center of the roll pin 254 (when viewed from the perspective of FIG. 8).

As such, the clamp 240 may be configured to rotate about the pivot pins 212 to a position proximate to the blade reception channel 232 to lock or clamp the blade 110 into place (e.g., between the clamp 240 and the blade mount base 200) responsive to the latch assembly 250 engaging and clamping onto the locking posts 234. In an example embodiment, a plane in which the blade 110 lies may be substantially parallel to a plane in which the clamp 240 lies and a plane in which the latch cover 252 lies when the wire element 256 is clamped to the locking posts 234.

Although not required, the latch cover 252 may be further secured in a clamped position in some embodiments. For example, a locking assembly 260 may be provided to enable the latch cover 252 to be further secured in the clamped position. The locking assembly 260 may include a locking protrusion 262 that may extend through a lock receiver 264 attached to or otherwise forming a portion of the latch cover 252. In some cases, a pin (not shown), such as a cotter pin, R-clip, hairpin or other pin, may extend through the locking protrusion 262 to engage the latch cover 252 responsive to insertion of the locking protrusion 262 through the lock receiver 264. However, in other embodiments, the locking protrusion 262 may include a rotatable catch 266 disposed at a distal end thereof. The rotatable catch 266 may have a slanted head to allow the lock receiver 264 (e.g., an aperture in the latch cover 252 shaped to receive the rotatable catch 266 and the distal end of the locking protrusion 262 therethrough) to slide easily over the rotatable catch 266 by rotating the head of the rotatable catch 266 when moving the latch cover 252 to the clamped position. After the latch cover 252 clears the rotatable catch 266, the rotatable catch 266 may be biased (e.g., by a helical torsion spring or other spring located proximate the axis of a hinge-type connection between the rotatable catch 266 and the locking protrusion 262) to rotate to a position at which the rotatable catch 266 prevents movement of the latch cover 252 out of the clamped position. To release the latch cover 252, the operator may simply rotate the rotatable catch 266 to enable the lock receiver 264 to clear the rotatable catch 266 and then rotate the latch cover 252 in the opposite direction to move it out of the clamped position. In the illustrated embodiment, the lock receiver 264, rotatable catch 266, and locking protrusion 262 are located near the end of the latch cover 252 opposite the roll pin 254 so that the operator may be able to rotate the rotatable catch 266 and lift the latch cover 252 out of the clamped position all with one hand.

As described above, FIG. 8 shows the latch cover 252 rotated to engage the wire element 254 with the locking posts 234. The rotatable catch 266 is also shown having cleared the latch cover 252 to prevent inadvertent unlatching of the blade mount 130. FIG. 8 also clearly shows the blade reception channel 232 formed between the blade mount base 200 and the clamp 240. The offset arrangement of the alignment protrusions 236 within the blade reception channel 232 is also visible.

Referring again to FIG. 7A, the blade mount base 200 may further include magnet receptacles 270. The magnet receptacles 270 may include magnets (not shown), such as neodymium magnets or other permanent magnets. These magnets may hold the metal blade 110 to the blade mount base 200 when the blade 110 is installed in the blade reception channel 232. Accordingly, for example, the operator may be enabled to reach under the cutting deck 40 with one hand and operate the latch cover 252 to push the rotatable catch 266 to allow the latch cover 252 to be rotated to release the wire element 254 from the locking posts 234. After rotating the clamp 240 away from the blade 110, the magnets in the magnet receptacles 260 may hold the blade 110 proximate to the blade mount base 200 to prevent the blade 110 from simply falling out of the blade mount 130. The operator may overcome the magnets and remove the blade 110 to sharpen or replace the blade 110. Meanwhile, when the blade 110 (either sharpened or replaced) is to be put back into the blade mount 130, the magnets may hold the blade 110 in place while the operator manipulates the latch assembly 250 to the clamped position. Thus, in some cases, the operator may be enabled to remove and/or replace the blade 110 with one hand, and without tools.

In some cases, lawn mowers (e.g., the riding lawn care vehicle 10) or cutting assemblies may be manufactured with embodiments of the blade mount 130 equipped thereon. Such devices may be equipped to enable quick-change blades to be employed directly out of the factory. However, it should also be appreciated that in some cases, the blade mount 130 may be mounted in the same manner in which a blade would otherwise be mounted. As such, for example, the blade mount base 200 may mount to the lawn mower in similar fashion to the manner in which a blade in normally mounted. Thereafter, a quick-change blade (e.g., blade 110) may be usable with the lawn mower and the lawn mower may thereafter be considered to be retrofitted to handle quick-change blades.

Referring now to FIG. 7B, the stamped version of the blade mount base 200' also includes an attachment orifice 220' disposed substantially at a midpoint of a longitudinal centerline of the blade mount base 200'. The blade mount base 200' also includes pivot pin receivers 202' disposed in guide posts 230' that may form one edge of a blade reception channel 232' at a surface of the blade mount base 200'. A locking post 234' may be disposed at an opposite side of the blade reception channel 232' relative to each respective one of the guide posts 230'. The blade reception channel 232' may include alignment protrusions 236' that may be disposed on opposite sides of the attachment orifice 220'. In some embodiments, the alignment protrusions 236' may protrude into the blade reception channel 232' from the blade mount base 200' to project into the alignment slots 160 of the blade 110. To ensure that the blade 110 cannot be installed incorrectly, the alignment protrusions 236' and the alignment slots 160 may be offset to opposite sides relative to a centerline of the longitudinal length of the blade 110. In an example embodiment, the alignment protrusions 236' may have a height that is approximately equal to the thickness of the blade 110 so that the tops of the alignment protrusions are flush with the surface of the blade 110 when the blade 110 is properly positioned in the blade reception channel 232'. In some cases, the blade mount base 200' may further include cover snap receivers 238' configured to receive snap fittings associated with the blade mount cover 132 (if employed). The blade mount base 200' may further include magnet receivers 270' as described above.

As shown in FIG. 7, the alignment protrusions 236 or 236' are disposed substantially equidistant from opposing sides of the longitudinal centerline of the blade mount base 200 or

200'. However, each of the alignment protrusions 236 or 236' are disposed to be offset relative to the transverse centerline of the blade mount base 200 or 200'. In other words, at least a majority portion of one of the alignment protrusions 236 or 236' is disposed on a first side of the transverse centerline of the blade mount base 200 or 200', while at least a majority portion of the other of the alignment protrusions 236 or 236' is disposed on a second side of the transverse centerline of the blade mount base 200 or 200' (the first and second sides being opposite sides of the transverse centerline).

Of note, the alignment slots 160 of the blade 110 are correspondingly formed to enable the blade 110 of some example embodiments to be held in place (at least in a direction substantially perpendicular to the axis of rotation of the blade 110 during operation) exclusively by the engagement between the alignment slots 160 and the alignment protrusions 236 or 236'. Meanwhile, the clamp 240 may assist in holding the blade 110 in place along the axis of rotation of the blade 110. Thus, for example, the alignment slots 160 are disposed substantially equidistant from opposing sides of the transverse centerline of the blade 110 (on opposite sides of the bolt receiver 170). However, each of the alignment slots 160 are disposed to be offset relative to the longitudinal centerline of the blade 110. In other words, at least a majority portion of one of the alignment slots 160 is disposed on a first side of the longitudinal centerline of the blade 110, while at least a majority portion of the other of the alignment slots 160 is disposed on a second side of the longitudinal centerline of the blade 110 (the first and second sides being opposite sides of the longitudinal centerline). As such, since the bolt receiver 170 is merely provided to enable the bolt 120 (or a nut attached to the bolt) to affix the blade mount 130 to the shaft 100, but the bolt receiver 170 itself does not engage, hold or facilitate holding of the blade 110 in place, the blade 110 is propelled exclusively via the engagement between the alignment slots 160 and the alignment protrusions 236 or 236'.

Although FIGS. 2-8 illustrate one example embodiment of a blade mount capable of supporting quick change blades, it should be appreciated that other example embodiments are also possible. Thus, for example, other shapes and constructions of quick-change blades may be supported. In some cases, quick-change blades may be single unitary components that are attachable to a blade mount in one piece. In such an embodiment, the blade mount may be configured to grasp the quick change blade at a center portion of the quick change blade. However, in other examples, quick change blades may include separate blade sections that attach to the blade mount. FIGS. 9-20 show various examples of quick-change blade arrangements that may be possible according to some alternative example embodiments.

In one example embodiment, a blade mount 300 may be provided that provides for attachment of a quick-change blade to the shaft via a different clamping mechanism than that which is shown in FIGS. 2-8. FIGS. 9-14 illustrate examples of another embodiment employing a quick-change blade system. In this regard, FIG. 9 illustrates a cross section of the cutting deck 40 in which a different clamping mechanism is employed. FIG. 10 illustrates a perspective view of a quick change blade 310 according to this example embodiment. FIG. 11, which includes FIGS. 11A and 11B, illustrates side views of the blade mount 300 of this example embodiment seen looking down the longitudinal length of the blade 310 (FIG. 11B) and looking at the blade 310 from a point perpendicular to the longitudinal length of the blade 310 (FIG. 11A). FIG. 12 illustrates a cross section view of the blade mount 300 and corresponding portions of the blade 310 with the blade 310 removed, and FIG. 13 shows roughly the same portions shown in FIG. 12, with the blade 310 affixed to the blade mount 300. FIG. 14, which includes FIGS. 14A and 14B, illustrates a cross section view of the blade mount 300 taken through horizontal channels 353 disposed in a blade release assembly 352 of the blade mount 300. In this regard, FIG. 14A is a cross section view looking down into the recess 330 at a level of the horizontal channels 353 and FIG. 14B is a cross section view looking in the opposite direction at a level of the horizontal channels 353.

In the examples of FIGS. 9-14, blade mount 300 employs a retractable set of locking pins within a releasable pin holding assembly to engage a shaped protrusion 320 that may be attached to or otherwise form a portion of the blade 310. FIG. 10 illustrates the shaped protrusion 320 in more detail. As can be seen in FIG. 10, the shaped protrusion 320 may be attached to a center portion of the blade 310. The attachment between the blade 310 and the shaped protrusion may be accomplished via connection bolts 322, as shown in FIG. 10, or via any other suitable method (e.g., welding, adhesives, rivets, and/or the like).

The shaped protrusion 320 may extend substantially perpendicularly away from a surface of the blade 310 to form a shape configured to fit within a correspondingly shaped recess 330 in the blade mount 300. The shape in FIG. 10 is substantially oval shaped. However, any suitable shape may be utilized including rectangular, square, hexagonal, star shaped, or various other shapes that may be regular or irregular. Even a round shape may be employed in some cases, such as when detents or other irregularities are provided on the round shape to prevent free rotation of the shaped protrusion 320 within the corresponding recess 330 in the blade mount 300.

In an example embodiment, the shaped protrusion 320 may be formed to taper slightly along its length extending away from the surface of the blade 310. The tapered shape may be matched by the recess 330 and may provide for an easier opportunity to fit the tapered end of the shaped protrusion 320 into the wider opening of the recess 330, while enabling the fit to become more snug until full seating of the shaped protrusion 320 in the recess 330 when the blade 310 is clamped within the blade mount 300. When fully seated, the shaped protrusion 320 may have a substantially tight fit with the recess 330. The shaped protrusion 320 may include pin reception slots 326 disposed on opposite sides of the shaped protrusion 320. In some embodiments, the pin reception slots 326 may be disposed at opposite sides of the shaped protrusion 320 along the longitudinal centerline of the blade 310 oriented to be substantially perpendicular to the longitudinal centerline of the blade 310. The pin reception slots 326 may mate with retractable pins associated with the blade mount 300 as described in greater detail below.

Referring now to FIGS. 9-13, the blade mount 300 may include a blade mount base 340 that may be affixed (e.g., via bolt 342 and in some cases also a washer 344) to a shaft 350 that may be coupled to the engine 50 as described above. As such, for example, the bolt 342 may pass through an orifice in the center portion of the blade mount base 340 to engage the shaft 350. In some embodiments, the blade mount base 340 may be shaped to fit a pattern (e.g., the star pattern shown in FIG. 7) disposed on a mounting plate 346 to which the blade mount base 340 attaches.

The blade mount base 340 may include sidewalls 348 that extend perpendicularly away from the mounting plate 346 when the blade mount base 340 is affixed to the mounting plate 346 (e.g., via tightening of the bolt 342) to form the recess 330. In some embodiments, a blade release assembly 352 may be operably coupled to the blade mount base 340. In this regard, for example, the blade release assembly 352 may extend around the circumference of the sidewalls 348 and may slidably engage the sidewalls 348. Moreover, in some examples, internal springs (not shown) may bias the blade release assembly 352 to be pushed away from the mounting plate 346 when the blade mount base 340 is attached to the mounting plate 346. When the operator pushes against the springs with sufficient force to overcome the spring force, the blade release assembly 352 may slide up the sidewalls 348 toward the mounting plate 346 in a direction indicated by arrow 355 of FIG. 12. However, when no force is applied to overcome the spring force, the blade release assembly 352 may be pushed in a direction opposite of the direction indicated by arrow 355 by the springs.

The sidewalls 348 may include a slanted pin channel 354 on each opposing side of the recess 330. The slanted pin channels 354 may be disposed such that one of the slanted pin channels 354 is positioned to correspond to each respective one of the pin reception slots 326 when the shaped protrusion 320 is inserted into the orifice 330. Although the slanted pin channel 354 of one example embodiment lies perpendicular to a longitudinal centerline of the blade 310 when the blade 310 is installed in the blade mount 300, such orientation is not required in all embodiments. A retractable pin 360 may be disposed in each of the slanted pin channels 354 and may be enabled to move freely within the slanted pin channel 354 and extend out of at least a portion of the slanted pin channel 354 and into the recess 330 when the blade release assembly 352 is in its rest position disposed farthest away from the mounting plate 346 responsive to urging from the internal springs. However, when the blade release assembly 352 is forced upward or toward the mounting plate 346 to overcome the internal springs, the retractable pin 360 may be withdrawn into the slanted pin channel 354 and out of the recess 330 as the retractable pin 360 rides along the slanted pin channel 354 in an upward direction to follow the movement of the blade release assembly 352.

To support movement within the slanted pin channel 354, the blade release assembly 352 may include a horizontal pin channel 353 that is oriented substantially parallel to the arrow 357. The retractable pin 360 may be disposed within the horizontal pin channel 353 and may be biased (e.g., via one or more springs) toward the recess 330 on each respective side. Thus, for example, when the blade release assembly 352 is in its rest position disposed farthest away from the mounting plate 346 responsive to urging from the internal springs, the retractable pin 360 may be pushed by biasing springs within the horizontal pin channel 353 toward the recess 330. In the rest position, the retractable pin 360 may be at least partially disposed within the orifice and may be capable of engaging its corresponding pin reception slot 326 to clamp the blade 310 to the blade mount 300. However, as the blade release assembly 352 is forced out of the rest position, the blade release assembly 352 may move upwardly (e.g., in the direction of arrow 355). Given that the retractable pin 360 is fixed in its vertical position relative to the blade release assembly 352 by virtue of its disposal within the horizontal pin channel 353, the retractable pin 360 may engage the slanted surface of the slanted pin channel 354 to ride within the slanted pin channel 354 upwardly, while being drawn away from the orifice 330 within its respective horizontal pin channel 353. Thus, contact with a surface of the slanted pin channel 354 may draw the retractable pin 360 away from the orifice 330 within the horizontal pin channel 353 to overcome the biasing springs and move the retractable pin 360 upwardly through the slanted pin channel 354.

In an example embodiment, a portion of the pin reception slot 326 may be slanted to match the gradient of the slanted surface of the slanted pin channel 354 to permit a smooth transition of the retractable pin 360 from having portions thereof in contact with the pin reception slot 326 (which is disposed in the orifice 330), to having all portions thereof in contact with the slanted pin channel 354. When the retractable pin 360 is pushed into the orifice 330 region to engage the pin reception slot 326, the blade 310 may be affixed to the blade mount 300. More specifically, the shaped protrusion 320 may be held proximate to the sidewalls 348 of the blade mount 300. However, when the retractable pin 360 is withdrawn from the orifice 330 into the horizontal pin channel 353 and further up (or away from the orifice 330) the slanted pin channel 354 to a point at which the retractable pin 360 is no longer within the pin reception slot 326, the blade 310 may be released from the blade mount 300. As such, an operator may use even a single hand, without any need for tools, to push the blade release assembly 352 upward (or toward the mounting plate 346) and release the blade 310. FIG. 12 illustrates a released blade 310, responsive to movement of the blade release assembly 352 toward the mounting plate 346. After the blade 310 is sharpened or replaced, the sharpened or replaced blade may then be affixed to the blade mount by simply aligning the shaped protrusion 320 with the orifice and pushing the sharpened or replaced blade upwardly until the retractable pin 360 engages the pin reception slot 326 to clamp the sharpened or replaced blade to the blade mount 300. FIG. 13 shows the blade 310 clamped to the blade mount 300 with the blade release assembly 352 in its rest position.

The example embodiments described above in connection with FIGS. 2-14 each support a single blade. In other words, a single blade that includes cutting surfaces at opposite ends thereof is held in place by a blade mount that engages the blade at a center portion of the blade. However, as indicated above, some embodiments may employ a blade mount that engages two (or more) separate blade portions. Thus, for example, separate cutting surfaces associated with corresponding separate blade portions may be supported from some example blade mounts associated with example embodiments of the present invention. FIGS. 15-18 illustrate examples of such embodiments.

In this regard, FIG. 15 illustrates a perspective view of a blade mount 400 of an example embodiment. The blade mount 400 of FIG. 15 includes one portion thereof with a blade engagement assembly 405 affixed thereto, and another portion with the blade engagement assembly 405 removed to facilitate explanation of the operation of an example embodiment. However, it should be appreciated that a working embodiment would include an equal number of blade engagement assemblies for the number of blades to be supported. FIG. 16 illustrates a perspective view of a quick-change blade 410 according to an example embodiment. FIG. 17 illustrates a perspective view of the blade 410 attached to the blade mount 400 by being clamped within the blade engagement assembly 405. FIG. 18 illustrates an exploded view of components of the blade engagement assembly 405 according to an example embodiment.

Referring to FIGS. 15-18, the blade mount 400 may include a blade mount base 420 that may include a mounting receiver 422 disposed at a center portion thereof. The mounting receiver 422 may be affixed to a rotatable shaft of the lawn mower (e.g., riding lawn care vehicle 10) as described above. In this regard, for example, the mounting receiver 422 may be an orifice shaped to match an engagement shape positioned on a mounting plate corresponding to a mandrel or other mounting surface to which the mounting receiver 422 may be affixed. A bolt may be passed through the mounting receiver 422 to engage the shaft and affix the blade mount 400 to the mounting plate. In some cases, a washer may be inserted between the bolt and the mounting receiver 422 to increase the contact area and holding force on the blade mount 400 to affix the blade mount 400 to the mounting plate of the lawn mower.

The blade mount base 420 may include a blade insertion slot 430 at each respective end of the blade mount base 420. Each blade insertion slot 430 may be configured to receive an example embodiment of the blade 410. In the example shown in FIG. 15, each blade insertion slot 430 provides an opening for insertion of the blade 410 into a corresponding blade engagement assembly 405 to be held within the blade insertion slot 430. The blade insertion slot 430 represents a gap that extends substantially parallel to the top and bottom surfaces of the blade mount base 420. The blade insertion slot 430 may extend at least from a distal end of the blade mount base 420 inwardly toward the mounting receiver 422. In this example embodiment, the blade insertion slot 430 also extends along one side of the blade mount base 420 from the distal end of the blade mount base 420 to a position proximate to the location of the mounting receiver 422 to enable side entry of the blade 410 into the blade insertion slot 430 and into the blade engagement assembly 405. However, in some example embodiments, both side portions may be closed and the blade insertion slot 430 may extend over only the distal end of the blade mount base 420. In such an example, the blade 410 would be inserted directly inline with a longitudinal centerline of the blade mount 400. However, in the example shown in FIG. 15, the blade 410 may be inserted from a side substantially perpendicular to the longitudinal centerline of the blade mount 400. More specifically, in the pictured example, blades may be entered into opposite sides of the blade mount 400 since the blade insertion slots 430 may extend over opposite sides of the blade mount body 420.

The blade 410 may include a blade body 412 that may take the form of an elongate plate shaped member. However, the blade body 412 may include one or more bends, curves or other shaping features to improve aerodynamic characteristics, cutting performance or other desirable characteristics. The blade body 412 may extend along its longitudinal centerline from a cutting end 414 to an attachment end 416. The cutting end 414 may include a leading edge portion that may be sharpened to cut vegetation as the blade 410 is rotated and a trailing edge portion that may be sloped or otherwise shaped for aerodynamic performance reasons. The cutting end 414 may form a distal end of the blade 410 relative to the blade mount 400 when the blade 410 is inserted into the blade mount 400 and the attachment end 416 may form a proximal end thereof since the attachment end 416 may be inserted into the blade insertion slot 430. In an example embodiment, the blade 410 may include one or more detent receivers 418 disposed proximate to the attachment end 416. The detent receivers 418 may receive one or more detents that may be retractably inserted into the detent receivers 418 to affix the blade 410 to the blade engagement assembly 405 or otherwise hold the blade 410 in place within the blade insertion slot 430. In the pictured example, the detent receivers 418 are round, and two are placed spaced apart along a longitudinal centerline of the blade 410. However, the detent receivers 418 could have other shapes, and other positions in alternative embodiments.

As can be seen in FIGS. 15, 17 and 18, the blade mount base 420 may include receiving orifices 424. The receiving orifices 424 of this example embodiment may be disposed along the longitudinal centerline of the blade mount base 420 at positions that correspond to the positions of the detent receivers 418 when the blade 410 is inserted into the blade insertion slot 430. As such, when the blade 410 is inserted into the blade insertion slot 430, the receiving orifices 424 may substantially align with the detent receivers 418. To lock the blade 410 within the blade insertion slot 430 as shown in FIG. 17, retractable detents 440 of FIG. 18 may pass through both the receiving orifices 424 and the detent receivers 418.

The retractable detents 440 may be disposed within a blade engagement assembly housing 450 of the blade engagement assembly 405 at locations that correspond to the receiving orifices 424. In an example embodiment, the retractable detents 440 may be spring loaded to be biased to be inserted through the receiving orifices 424 and, if the blade 410 is in the blade insertion slot 430, through the detent receivers 418. In an example embodiment, the retractable detents 440 may include slide engaging surfaces 442 that may be configured to engage sliding surfaces 444 disposed on an unlocking tab 446. The unlocking tab 446 of this example may be disposed at a side portion of the blade engagement assembly housing 450 and may extend out of a gap between a portion of the blade engagement assembly housing 450 and the blade mount base 420. As such, a portion of the unlocking tab 446 may slide along a surface of the blade mount base 420 responsive to an operator pressing on the unlocking tab 446. When the unlocking tab 446 slides over the blade mount base 420 further into the blade engagement assembly housing 450, the sliding surfaces 444 may engage the side engaging surfaces 442 and lift the retractable detents 440 out of the detent receivers 418. The blade 410 may then be unclamped and removable from the blade mount 400.

In some embodiments, the retractable detents 440 may include slanted surfaces at distal ends thereof and the slanted surfaces may be oriented toward a direction from which entry of the blade 410 into the blade insertion slot 430 is expected. As such, when the blade 410 is inserted into the blade insertion slot 430, the blade 410 may engage the slanted surfaces and enable the retractable detents 440 to ride upward and out of the way of the blade 410 until the blade 410 is inserted to a point at which the detent receivers 418 are substantially aligned with the receiving orifices 424, at which time the retractable detents may be inserted through the detent receivers 418 to hold the blade 410 in place within the blade insertion slot 430.

In some embodiments, the blade insertion slot 430 may be formed to have a width that is slightly wider than the width of the blade 410. However, in some cases, the blade engagement assembly housing 450 may be provided with one or more sets of spring loaded rollers 460 that may enable different blade widths to be accounted for by consuming any gaps between the blade 410 and interior walls defining the blade insertion slot 430. As shown in FIG. 18, the spring loaded rollers 460 may include springs 462 that engage the blade engagement assembly housing 450 at one end thereof, and engage a roller ball 464 at the other end thereof. The rollers 460 may extend through roller receivers 466 disposed in the blade mount base that extend into the blade insertion slot 430. The roller receivers 466 may be arrayed in any desirable arrangement and may be included on the top and bottom of the blade mount base 420 or just on one of the top or bottom of the blade mount base 420. As the blade 410 is inserted into the blade insertion slot 430, the rollers 460 may be urged into contact with the blade 410 to assist in providing a secure fit between the blade 410 and the blade mount 400. When the retractable detents 440 engage the receiving orifices 424, the blade 410 may be held securely within the blade mount 400. However, when the unlocking tab 446 is depressed to remove the retractable detents 440 from engagement with the receiving orifices 424, the operator may slide the blade 410 out of engagement with the rollers 460 and out of the blade insertion slot 430 to enable the operator to sharpen or replace the blade 410.

In some cases, the blade mount 400 may be modified to support additional blades beyond just two. Although a blade mount could simply be provided with additional body portions extending to provide additional blade insertion slots, in some cases, multiple blade mounts could be stacked on each other in an offset fashion, for example, to provide mulching capabilities. FIGS. 19-21 illustrate one such example embodiment. In this regard, FIG. 19 illustrates a top view of a blade mount 500 according to another example embodiment. FIG. 20 illustrates a perspective view of the blade mount 500 with quick-change blades 510 removed. FIG. 21 illustrates a perspective view of the blade mount with the blades 510 installed.

The blades 510 may be similar to the blades 410 shown in FIGS. 15-18 except that in this example the blades 510 only include a single detent receiver 518 since the blade mount 500 employs a blade insertion slot 530 that extends only across the distal end of the blade mount 500. The blade mount 500 also operates similar to the blade mount 400 except that unlocking tab 546, which is depressed to release a locked blade, may be disposed at the distal end of the blade mount 500 instead of on the side of the blade mount 400 of FIGS. 15-18. As shown in FIGS. 19-21, the blade mount 500 may include two vertically offset blade mount components (e.g., upper blade mount component 502 and lower blade mount component 504) so that the blades 510 associated with the upper blade mount component 502 may be at a different elevation than blades associated with the lower blade mount component 504. This configuration may assist with providing a mulching action as the blades are rotated by a lawn mower.

Thus, example embodiments provide various different ways that a quick-change blade system may be employed to provide operators with a mechanism by which blades may be removed or replaced relatively easily and quickly. Moreover, some example embodiments may enable blade removal and/or replacement to be performed without tools and, in at least some cases with one hand. Some embodiments may enable blade change/replacement to be performed without tipping the lawn mower, elevating the lawn mower or removing the cutting deck. Thus, operators may enjoy a simpler blade change/removal procedure and may be encouraged to perform blade sharpening or replacement on a more frequent basis to keep lawn care performance and quality at a high level. In some embodiments, a blade mount is provided that may be operably coupled to a rotatable shaft. The blade mount may include at least one engagement slot (e.g., blade insertion slot 430/530) enclosing at least a portion of at least one blade. The blade mount may further include at least one protruding member (e.g., retractable detents 440) disposable within the engagement slot to secure the at least one blade within the engagement slot responsive to insertion of the at least one blade into the engagement slot. In some embodiments, the blade mount may include an orifice configured to releasably receive a shaped protrusion operably coupled to at least one blade. The blade mount may include a blade release assembly configured to facilitate holding the shaped protrusion within the orifice in a first position of the blade release assembly and to release the shaped protrusion responsive to movement of the blade release assembly to a second position. In some embodiments, the blade mount may include a latch assembly configured to rotate a clasp relative to a blade reception channel to engage at least a portion of the at least one blade.

In an example embodiment, a lawn care device is provided. The lawn care device may include a cutting deck housing at least one blade, a rotatable shaft, and a blade mount operably coupled to the rotatable shaft. The blade mount may include at least one engagement slot configured to enclose at least a portion of the at least one blade. The blade mount may further include at least one protruding member disposed within the engagement slot to secure the at least one blade within the engagement slot responsive to insertion of the at least one blade into the engagement slot.

The lawn care device of some embodiments may include additional features that may be optionally added. For example, in some embodiments, (1) the engagement slot may be defined by a latch assembly. The engagement slot may be formed between a blade mount base and a rotatable clasp of the latch assembly. Additionally or alternatively (2), the at least one protruding member may be provided at the blade mount base to include a first protruding member and a second protruding member, where the first and second protruding members are disposed substantially equidistant from respective opposing sides of a longitudinal centerline of the blade mount base. Additionally or alternatively (3), the first and second protruding members may be disposed to be offset relative to the transverse centerline of the blade mount base. Additionally or alternatively (4), at least a majority portion of the first protruding member may be disposed on a first side of the transverse centerline of the blade mount base and at least a majority portion of the second protruding member is disposed on a second side of the transverse centerline of the blade mount base. In some embodiments, any or all of (1) to (4) may be employed, and the blade mount base may engage one face of the blade and the clasp may engage an opposite face of the blade responsive to the blade being held by the blade mount. In some embodiments, any or all of (1) to (4) may be employed, and the clasp may further include a locking assembly and a latch cover, where the locking assembly enables the latch cover to be secured to hold the clasp proximate to the blade. In some embodiments, any or all of (1) to (4) may be employed, and the blade mount base may include a set of guide posts and a set of locking posts disposed on opposing sides of the engagement slot, where the clasp further comprises a locking assembly and a latch cover, and the locking assembly enables the latch cover to be secured to hold the clasp proximate to the blade via engagement of a wire element with the set of locking posts. In some embodiments, any or all of (1) to (4) may be employed, and the blade mount base may include a set of guide posts and a set of locking posts disposed on opposing sides of the engagement slot, where the clasp further comprises a locking assembly and a latch cover, the locking assembly enables the latch cover to be secured to hold the clasp proximate to the blade via engagement of a wire element with the set of locking posts, the wire element is rotatably coupled with the clasp to provide a spring force to pull the latch cover down toward the clamp when the latch cover is rotated such that a substantial portion of the latch cover lies in a plane substantially perpendicular to a plane in which the clasp lies while the wire element engages the set of locking posts. In some embodiments, any or all of (1) to (4) may be employed, and the clasp may further include a locking assembly and a latch cover, the locking assembly enabling the latch cover to be secured to hold the clasp proximate to the blade, wherein the locking assembly comprises a locking protrusion configured to extend through a lock receiver attached to or otherwise forming a portion of the latch cover, and wherein the locking protrusion comprises a rotatable catch disposed at a distal end thereof. In some embodiments, any or all of (1) to (4) may be employed, and the blade mount may include a non-circular shaped aperture configured to receive a correspondingly shaped protrusion therein to couple the blade mount to the rotatable shaft. In some embodiments, the non-circular shaped aperture may include a star-shaped hole. In some embodiments, the engagement slot may include a non-circular and tapered cavity configured to receive a correspondingly shaped protrusion that may be attached to or otherwise form a portion of the blade, and the at least one protruding member may be disposed within the engagement slot of the blade mount which may include a retractable set of locking pins within a releasable pin holding assembly and may be configured to engage apertures in the shaped protrusion attached to or otherwise forming a portion of the blade. In an example embodiment, the engagement slot may include a plurality of spring-loaded rollers configured to allow a portion of a blade to be slid into the engagement slot, the at least one protruding member may include at least one retractable detent, and the blade mount may further include an unlocking tab that, when actuated, is configured to remove the at least one retractable detent from engagement with at least one receiving orifice in a blade disposed in the engagement slot.

In another example embodiment, a blade mount may be provided. The blade mount may be configured to couple a blade to a rotatable shaft. The blade mount may include at least one engagement slot configured to enclose at least a portion of the blade, and at least one protruding member disposed within the engagement slot to secure the blade within the engagement slot responsive to insertion of the blade into the engagement slot. The blade mount may be provided with the features and combinations of features described above.

In another example embodiment, a cutting blade for a lawn mower is provided. The blade may include a top face, a bottom face, and at least one alignment slot forming a cutout portion of the blade passing from one of the top face or bottom face toward the other of the top face or the bottom face. The at least one alignment slot may be disposed spaced apart from an axis of rotation of the blade to receive a corresponding protruding member of a blade mount configured to hold the blade, via engagement of the protruding member with the at least one alignment slot, at a portion of the blade other than at the axis of rotation during rotation of the blade responsive to operation of the lawn mower.

In some embodiments, (1) the at least one alignment slot may include a first alignment slot disposed spaced apart from the axis of rotation of the blade to receive a corresponding first protruding member of the blade mount, and a second alignment slot disposed spaced apart from the axis of rotation of the blade to receive a corresponding second protruding member of the blade mount. The first and second alignment slots may be disposed on substantially opposite sides of the axis of rotation. Alternatively or additionally (2), the first and second alignment slots may each be disposed substantially equidistant from opposing sides of a transverse centerline of the blade. Additionally or alternatively (3), the first and second alignment slots may each be disposed to be offset relative to a longitudinal centerline of the blade. Additionally or alternatively (4), at least a majority portion of the first alignment slots may be disposed on a first side of the longitudinal centerline of the blade, and at least a majority portion of the second alignment slot is disposed on a second side of the longitudinal centerline of the blade. In some embodiments, any or all of (1) to (4) may be employed, and the blade may further include a bolt receiver disposed at the axis of rotation of the blade to enable a bolt that affixes the blade mount to the lawn mower to pass through the bolt receiver. In some embodiments, any or all of (1) to (4) may be employed, and the blade may further include a bolt receiver disposed at the axis of rotation of the blade to enable a bolt that affixes the blade mount to the lawn mower to pass through the bolt receiver without any contact between the bolt and the bolt receiver. In some embodiments, any or all of (1) to (4) may be employed, and the blade may be propelled exclusively via engagement between the first and second alignment slots and the first and second protruding members.

Although some example embodiments have been described above in the context of employment within the cutting deck of a riding lawn mower, it should be appreciated that example embodiments may also be practiced in other contexts as well. For example, numerous other types of outdoor power equipment that employ blades could benefit from employment of quick-change blade technology as described herein. Thus, example embodiments may be practiced on either riding or walk behind lawn mower models as well as in connection with trimmers, edgers, circular saws, chain saw bars, agricultural equipment, and/or the like. Still other example embodiments may be practiced on other devices as well. For example, some embodiments of the quick-change mounting systems may be used to attach fan blades to a fan and/or other rotary elements to a rotating spindle.

Moreover, as indicated above, some models may be produced from the factory with quick-change fittings installed. However, other models may be retrofitted by installing a blade mount in a similar fashion to that which was previously used to install the blades themselves. Once the blade mount is in place, quick-change blades may be employed even by older models.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A blade mount configured to couple a blade to a rotatable shaft, the blade mount comprising:
   a blade mount base configured to contact at least a portion of the blade;
   a latch assembly disposed proximate to the blade mount base to secure the blade to the blade mount base responsive to operation of the latch assembly, the latch assembly comprising a pivotable clamp, the clamp pivoting relative to the blade mount base; and at least one magnet receptacle disposed at the blade mount base to receive a corresponding at least one magnet to hold the blade proximate to the blade mount base prior to operation of the latch assembly, wherein the blade mount base comprises a set of guide posts and a set of locking posts disposed on opposing sides of a blade reception channel, and wherein the clamp further comprises a locking assembly and a latch cover, the locking assembly enabling the latch cover to be secured to hold the clamp proximate to the blade via engagement of a wire element with the set of locking posts.

2. The blade mount of claim 1, wherein the blade mount comprises a first magnet receptacle and a second magnet receptacle, and wherein the first magnet receptacle is disposed spaced apart from an axis of rotation of the blade on an opposite side of the axis of rotation relative to the second magnet receptacle.

3. The blade mount of claim 2, wherein the first and second magnet receptacles are spaced apart from the axis of rotation by equal amounts.

4. The blade mount of claim 2, wherein the first and second magnet receptacles are disposed on opposite sides of a transverse centerline of the blade mount.

5. The blade mount of claim 2, wherein the first and second magnet receptacles are disposed on opposite sides of a longitudinal centerline of the blade mount.

6. The blade mount of claim 3, wherein the first and second magnet receptacles are disposed on opposite sides of a longitudinal centerline of the blade mount.

7. The blade mount of claim 4, wherein the first and second magnet receptacles are disposed on opposite sides of a longitudinal centerline of the blade mount.

8. The blade mount of claim 1, wherein the blade mount base engages one face of the blade and the clamp engages an opposite face of the blade responsive to the blade being held by the blade mount.

9. A blade mount configured to couple a blade to a rotatable shaft, the blade mount comprising:
   a blade mount base configured to contact at least a portion of the blade;
   a latch assembly disposed proximate to the blade mount base to secure the blade to the blade mount base responsive to operation of the latch assembly, the latch assembly comprising a pivotable clamp, the clamp pivoting relative to the blade mount base; and
   at least one magnet receptacle disposed at the blade mount base to receive a corresponding at least one magnet to hold the blade proximate to the blade mount base prior to operation of the latch assembly,
   wherein the blade mount base comprises a set of guide posts and a set of locking posts disposed on opposing sides of a blade reception channel, and wherein the clamp further comprises a locking assembly and a latch cover, the locking assembly enabling the latch cover to be secured to hold the clamp proximate to the blade via engagement of a wire element with the set of locking posts, the wire element being rotatably coupled with the clamp to provide a spring force to pull the latch cover down toward the clamp when the latch cover is rotated such that a substantial portion of the latch cover lies in a plane substantially perpendicular to a plane in which the clamp lies while the wire element engages the set of locking posts.

10. A lawn care device comprising:
    a rotatable shaft;
    an engine operably coupled to the rotatable shaft;
    a blade configured to turn responsive to rotation of the rotatable shaft; and
    a blade mount operably coupling the blade to the rotatable shaft, the blade mount comprising:
      a blade mount base configured to contact at least a portion of the blade;
      a latch assembly disposed proximate to the blade mount base to secure the blade to the blade mount base responsive to operation of the latch assembly, the latch assembly comprising a pivotable clamp, the clamp pivoting relative to the blade mount base; and
      at least one magnet receptacle disposed at the blade mount base to receive a corresponding at least one magnet to hold the blade proximate to the blade mount base prior to operation of the latch assembly,
      wherein the blade mount base comprises a set of guide posts and a set of locking posts disposed on opposing sides of a blade reception channel, and wherein the clamp further comprises a locking assembly and a latch cover, the locking assembly enabling the latch cover to be secured to hold the clamp proximate to the blade via engagement of a wire element with the set of locking posts.

11. The lawn care device of claim 10, wherein the wire element is rotatably coupled with the clamp to provide a spring force to pull the latch cover down toward the clamp when the latch cover is rotated such that a substantial portion of the latch cover lies in a plane substantially perpendicular to a plane in which the clamp lies while the wire element engages the set of locking posts.

12. The lawn care device of claim 10, wherein the blade mount comprises a first magnet receptacle and a second magnet receptacle, and wherein the first magnet receptacle is disposed spaced apart from an axis of rotation of the blade on an opposite side of the axis of rotation relative to the second magnet receptacle.

13. The lawn care device of claim 12, wherein the first and second magnet receptacles are spaced apart from the axis of rotation by equal amounts.

14. The lawn care device of claim 13, wherein the first and second magnet receptacles are disposed on opposite sides of a longitudinal centerline of the blade mount.

15. The lawn care device of claim 12, wherein the first and second magnet receptacles are disposed on opposite sides of a transverse centerline of the blade mount.

16. The lawn care device of claim 15, wherein the first and second magnet receptacles are disposed on opposite sides of a longitudinal centerline of the blade mount.

17. The lawn care device of claim 10, wherein the blade mount base engages one face of the blade and the clamp engages an opposite face of the blade responsive to the blade being held by the blade mount.

18. The lawn care device of claim 10, wherein the lawn care device comprises a walk-behind lawn mower.

19. The lawn care device of claim 10, wherein the lawn care device comprises a riding lawn mower.

20. The lawn care device of claim 10, wherein the set of locking posts is a single locking post.

* * * * *